US011307854B2

(12) United States Patent
Doshi et al.

(10) Patent No.: US 11,307,854 B2
(45) Date of Patent: Apr. 19, 2022

(54) MEMORY WRITE LOG STORAGE PROCESSORS, METHODS, SYSTEMS, AND INSTRUCTIONS

(71) Applicant: Intel Corporation, Santa Clara, CA (US)

(72) Inventors: Kshitij Doshi, Tempe, AZ (US); Roman Dementiev, Heidelberg (DE); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/891,028

(22) Filed: Feb. 7, 2018

(65) Prior Publication Data
US 2019/0243768 A1 Aug. 8, 2019

(51) Int. Cl.
*G06F 9/30* (2018.01)
*G06F 9/38* (2018.01)
*G06F 12/0875* (2016.01)

(52) U.S. Cl.
CPC ........ *G06F 9/30043* (2013.01); *G06F 9/3004* (2013.01); *G06F 9/3834* (2013.01); *G06F 9/30145* (2013.01); *G06F 9/30178* (2013.01); *G06F 12/0875* (2013.01); *G06F 2212/452* (2013.01)

(58) Field of Classification Search
CPC ............. G06F 9/30043; G06F 9/30036; G06F 9/30145; G06F 9/3004; G06F 12/0875; G06F 11/30
See application file for complete search history.

(56) References Cited

U.S. PATENT DOCUMENTS

| 6,453,389 | B1 * | 9/2002 | Weinberger | G06F 12/0862 711/137 |
| 7,434,000 | B1 * | 10/2008 | Barreh | G06F 12/0859 711/118 |
| 9,411,739 | B2 | 8/2016 | Shaikh et al. | |
| 9,886,350 | B2 * | 2/2018 | Guthrie | G06F 11/1451 |
| 2008/0162885 | A1 | 7/2008 | Wang et al. | |
| 2008/0270745 | A1 | 10/2008 | Saha et al. | |
| 2014/0164709 | A1 * | 6/2014 | Guthrie | G06F 12/0806 711/134 |
| 2015/0032998 | A1 | 1/2015 | Rajwar et al. | |

(Continued)

OTHER PUBLICATIONS

Extended European Search Report for Application No. EP19151260, dated Jul. 5, 2019, 6 pages.

(Continued)

*Primary Examiner* — William B Partridge
(74) *Attorney, Agent, or Firm* — Nicholson De Vos Webster & Elliott LLP

(57) ABSTRACT

A processor of an aspect includes a decode unit to decode an instruction. The instruction is to indicate a destination memory address information. An execution unit is coupled with the decode unit. The execution unit, in response to the decode of the instruction, is to store memory addresses, for at least all initial writes to corresponding data items, which are to occur after the instruction in original program order, to a memory address log. A start of the memory address log is to correspond to the destination memory address information. Other processors, methods, systems, and instructions are also disclosed.

24 Claims, 25 Drawing Sheets

(56) References Cited

U.S. PATENT DOCUMENTS

| | | | |
|---|---|---|---|
| 2015/0143055 A1* | 5/2015 | Guthrie | G06F 12/0806 711/135 |
| 2016/0092118 A1* | 3/2016 | Kumar | G06F 3/0604 711/154 |
| 2016/0378467 A1 | 12/2016 | Doshi | |
| 2017/0177365 A1 | 6/2017 | Doshi et al. | |
| 2017/0322875 A1 | 11/2017 | Gschwind et al. | |
| 2018/0004521 A1 | 1/2018 | Kleen et al. | |
| 2018/0143850 A1* | 5/2018 | Avni | G06F 9/467 |

OTHER PUBLICATIONS

Intention to Grant, EP App. No. 19151260.7, dated Jan. 26, 2021, 7 pages.

Communication pursuant to Article 94(3) EPC, EP App. No. 19151260.7, dated Feb. 25, 2020, 5 pages.

Doshi et al., "Atomic Persistence for SCM with a Non-intrusive Backend Controller", 2016 IEEE International Symposium on High Performance Computer Architecture (HPCA), IEEE, Mar. 2016, All pages relevant, Especially pp. 77-83, 13 pages.

Intel, "Chapter 12, INTEL(registered) TSX Recommendations", Intel(registered) 64 and IA-32 Architectures Optimization Reference Manual, Order No. 248966-030, Sep. 2014, All pages relevant, Especially pp. 12-1 to 12-24, 31 pages.

Intel, "Chapter 16, Programming With INTEL(registered) Transactional Synchronization Extensions", Intel(registered) 64 and IA-32 Architectures Software Developer's Manual, vol. 1: Basic Architecture, Order No. 253665-063US, Jul. 2017, All pages relevant, Especially pp. 16-1 to 16-8, 11 pages.

Joshi et al., "ATOM: Atomic Durability in Non-volatile Memory through Hardware Logging", 2017 IEEE International Symposium on High Performance Computer Architecture (HPCA), IEEE, Feb. 2017, All pages relevant, Especially pp. 361-368, 12 pages.

Nguyen, Andrew T., "Investigation of Hardware Transactional Memory", Department of Electrical Engineering and Computer Science, Massachusetts Institute of Technology, Jun. 2015, All pages relevant, Especially pp. 3, 9-23, 43, 47pages.

Decision to grant a European patent, EP App. No. 19151260.7, dated Jun. 17, 2021, 2 pages.

* cited by examiner

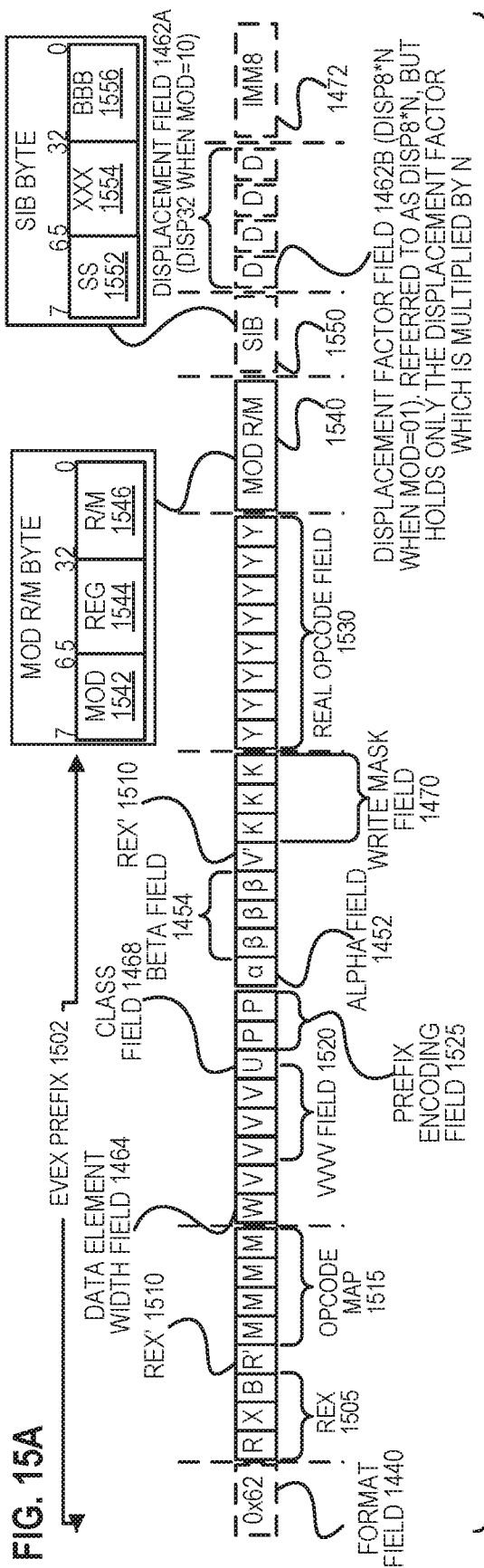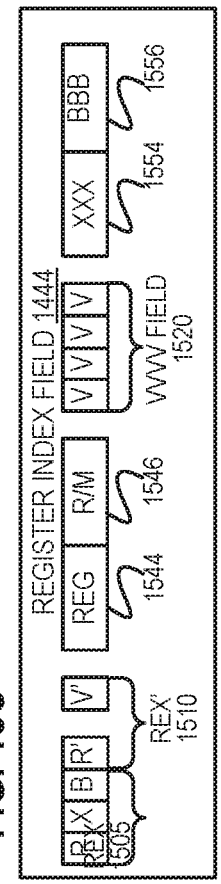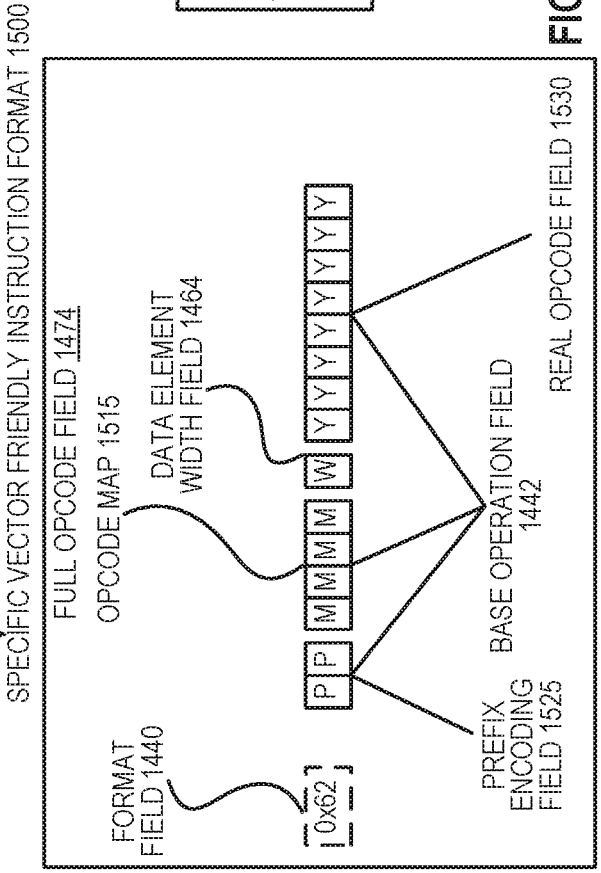

FIG. 17A
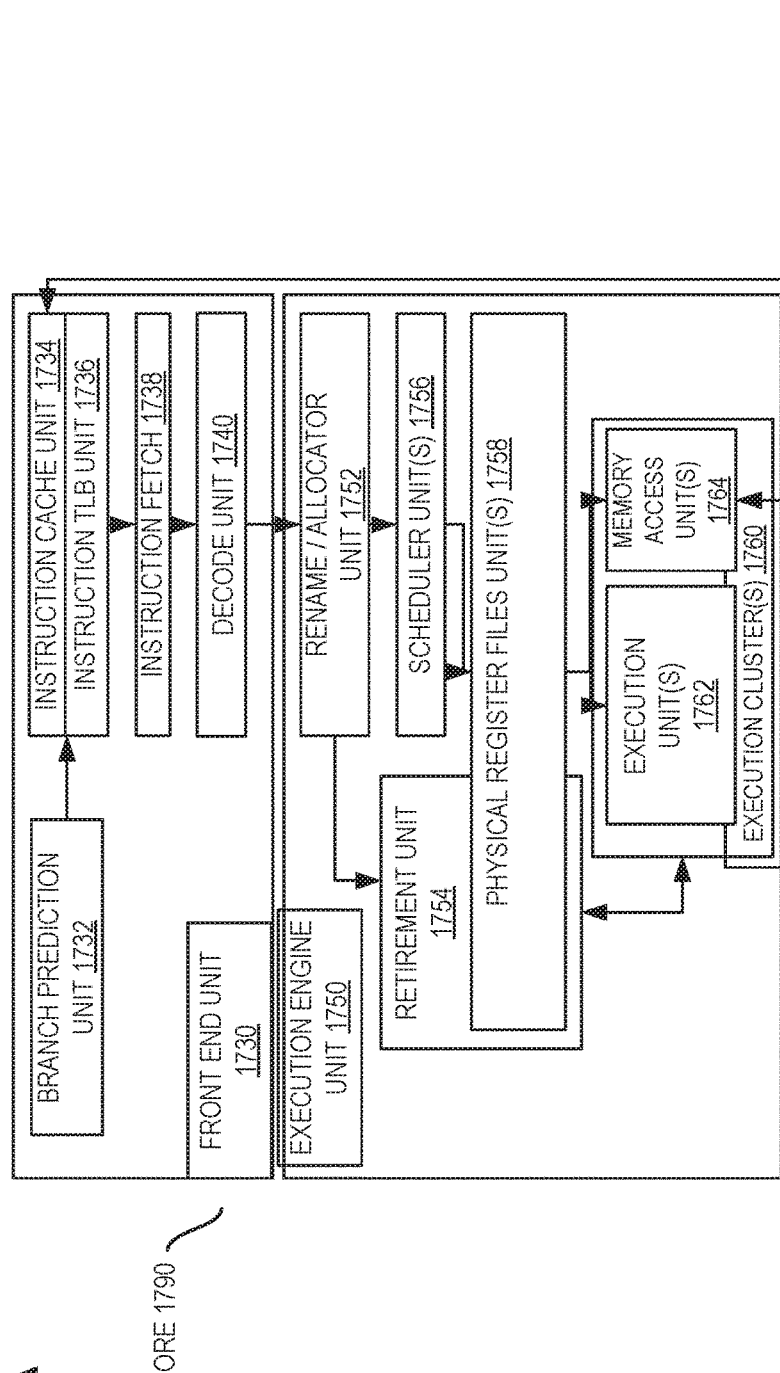
FIG. 17B
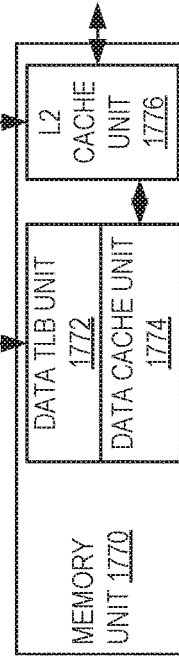

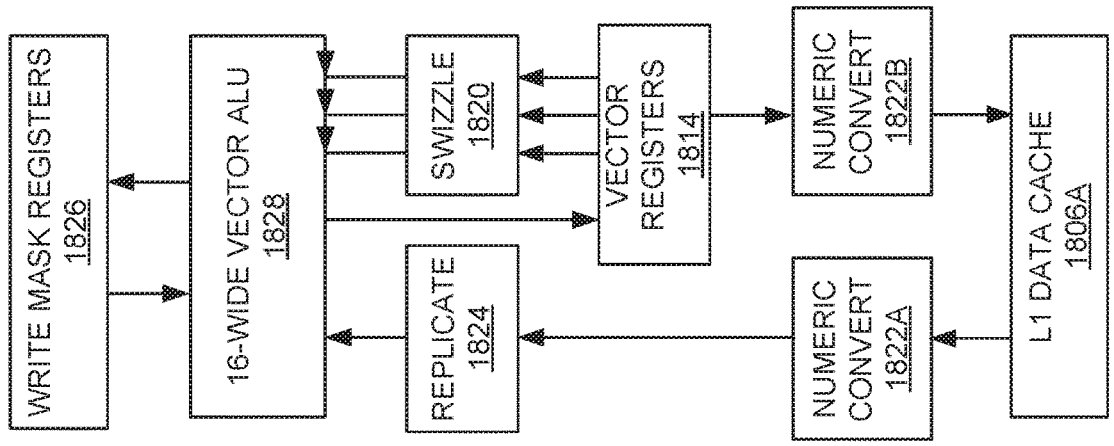
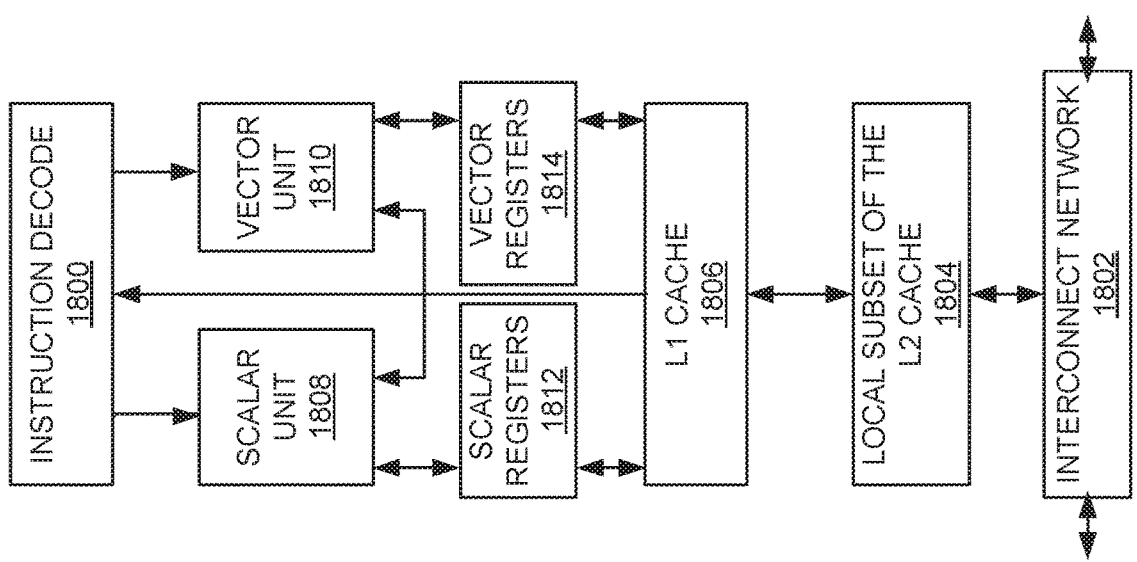

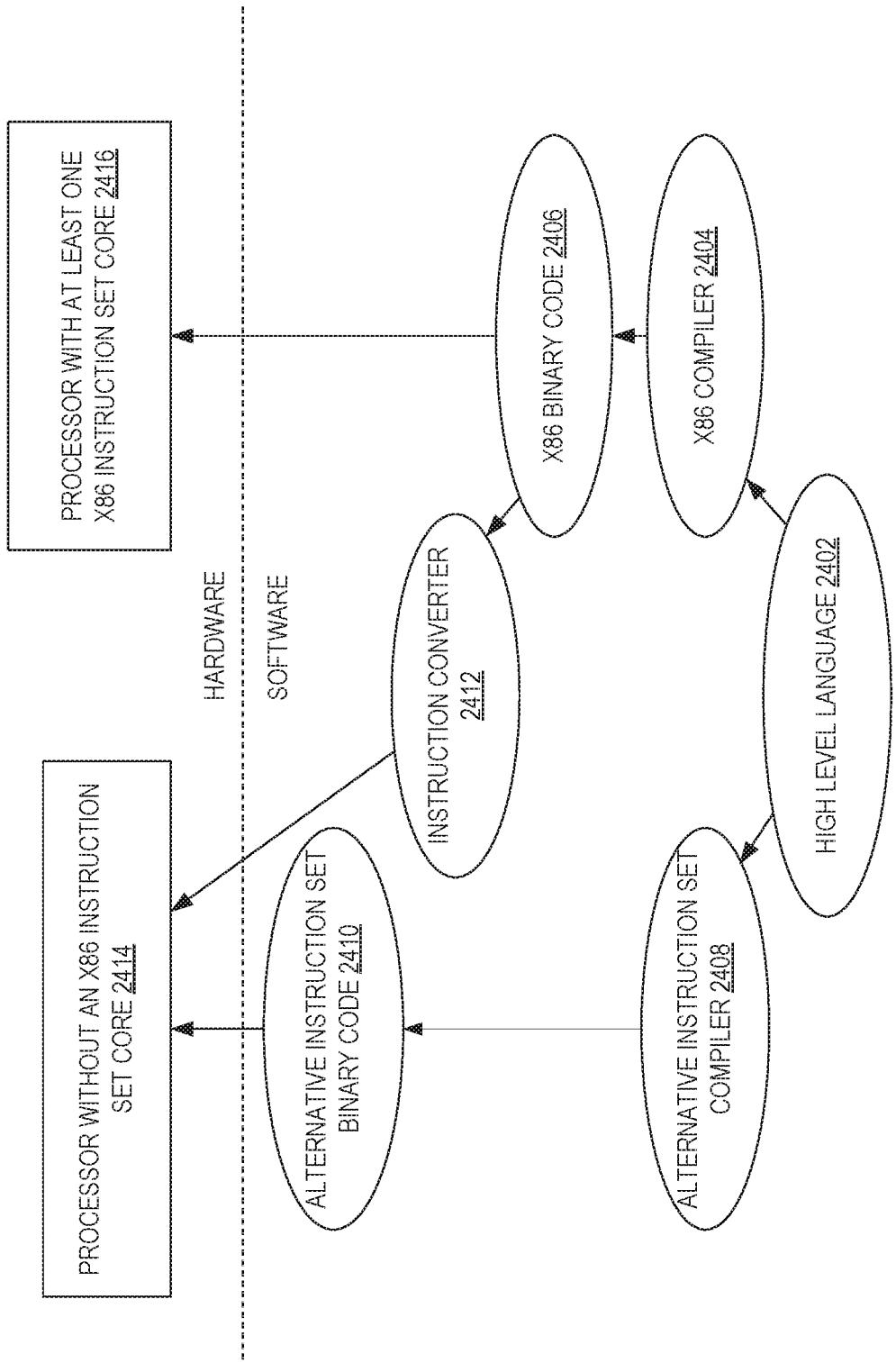

MEMORY WRITE LOG STORAGE PROCESSORS, METHODS, SYSTEMS, AND INSTRUCTIONS

BACKGROUND

Technical Field

Embodiments described herein generally relate to processors. More specifically, embodiments described herein generally relate to logging information about the operation of the processors.

Background Information

Processors are generally able to execute instructions to access memory. For example, the processors may execute load or read instructions to load or read data from the memory, and store or write instructions to store or write data to the memory.

To help improve performance, the processors commonly have at least one cache, or often a cache hierarchy that includes multiple caches at different cache levels. Each of the caches may represent a relatively small, fast access, local storage that is relatively closer to a core, hardware thread, or other logical processor (e.g., its arithmetic and logical execution units) than the system memory. By way of example, the processor may include a first level or level one (L1) cache closest to the logical processor, optionally a second level or level two (L2) cache next closest to the logical processor, and optionally a third level or level three (L3) cache farthest from the logical processor and closest to the system memory.

During operation the caches may be used to cache or temporarily store data that has been loaded into the processor from the system memory. Subsequently, when the processor wants to read the same data from the system memory, or write to the data from the system memory, the processor may first check to see if a copy of the data is currently stored in the caches. If the data is stored in the caches, then the data may be accessed more quickly from the caches, than if the data had to be accessed from the system memory. Or, a cache miss may occur if the data is not stored in a cache. By way of example, if there is a cache miss in the L1 data cache, the L1 data cache (e.g., its corresponding L1 data cache controller) may check to see if the sought data is in one or more other caches (e.g., an L2 cache and/or an L3 cache). If the data is not stored in any caches, the data may be obtained from the system memory, and stored as a cache line in the caches (e.g., in the L1 data cache).

BRIEF DESCRIPTION OF THE DRAWINGS

Embodiments of the invention may best be understood by referring to the following description and accompanying drawings that are used to illustrate embodiments. In the drawings:

FIG. 14A is a block diagram illustrating a generic vector friendly instruction format and class A instruction templates thereof according to embodiments of the invention.

FIG. 14B is a block diagram illustrating the generic vector friendly instruction format and class B instruction templates thereof according to embodiments of the invention.

FIG. 15A is a block diagram illustrating an exemplary specific vector friendly instruction format according to embodiments of the invention.

FIG. 15B is a block diagram illustrating the fields of the specific vector friendly instruction format that make up the full opcode field according to one embodiment of the invention.

FIG. 15C is a block diagram illustrating the fields of the specific vector friendly instruction format that make up the register index field according to one embodiment of the invention.

FIG. 17A is a block diagram illustrating both an exemplary in-order pipeline and an exemplary register renaming, out-of-order issue/execution pipeline according to embodiments of the invention.

FIG. 17B is a block diagram illustrating both an exemplary embodiment of an in-order architecture core and an exemplary register renaming, out-of-order issue/execution architecture core to be included in a processor according to embodiments of the invention.

FIGS. 18A-B illustrate a block diagram of a more specific exemplary in-order core architecture, which core would be one of several logic blocks (including other cores of the same type and/or different types) in a chip.

FIG. 24 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are embodiments of begin memory write log instructions and end memory write log instructions. Also disclosed are embodiments of processors to perform one or more of these instructions, embodiments of methods performed by the processors when performing one or more of these instructions, embodiments of systems incorporating one or more processors to perform one or more of these instructions, and embodiments of programs or machine-readable mediums providing one or more of these instructions. In the following description, numerous specific details are set forth (e.g., specific instruction operations, sequences of operations, types of data structures, processor configurations, possible microarchitectural implementation details, etc.). However, embodiments may be practiced without these specific details. In other instances, well-known circuits, structures and techniques have not been shown in detail to avoid obscuring the understanding of the description.

Figure 1:
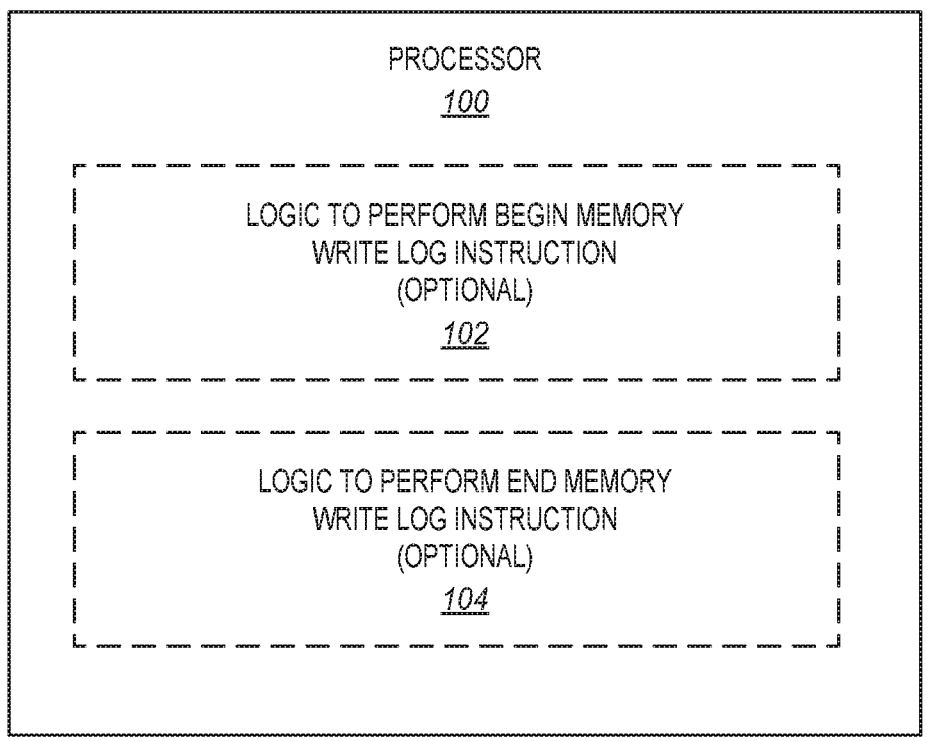
FIG. 1 is a block diagram of an embodiment of a processor.

FIG. 1 is a block diagram of an embodiment of a processor 100. In some embodiments, the processor may be a general-purpose processor (e.g., a general-purpose microprocessor or central processing unit (CPU) of the type used in desktops, laptops, smartphones, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). Commonly, the processor may be disposed on at least one integrated circuit or semiconductor die. Commonly, the processor may include at least some hardware (e.g., transistors, non-volatile memory storing circuit-level instructions/control signals, integrated circuitry, or the like).

The processor may have and/or be characterized by an instruction set architecture (ISA). The ISA represents a part of the architecture of the processor related to programming, and commonly includes the native instructions (i.e., the instructions of the instruction set), architectural registers, data types, addressing modes, memory architecture, and the like, of the processor. The ISA is distinguished from the microarchitecture, which generally represents the specific processor design techniques used to implement the ISA. The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

In some embodiments, the instruction set of the processor may optionally include a begin memory write log instruction, and the processor may include logic 102 to perform the begin memory write log instruction. By way of example, such logic may include a decode unit, or other unit or logic, to decode the begin memory write log instruction, and an execution unit, or other unit or logic, to execute or perform the begin memory write log instruction. In some embodiments, the execution or performance of the begin memory write log instruction may cause the execution unit and/or the logic and/or the processor to begin memory write logging and to store one or more logs that contain information about at least some writes to memory. By way of example, such information may include the memory addresses of the writes, the cache lines or other data items corresponding to the writes, the times that the writes are being performed, memory address context or metadata associated with the writes (e.g., identifiers of processes that performed the writes), or the like, or various combinations thereof. In various embodiments, such information may be logged for only the initial or first writes to data items (e.g., commonly the original/initial data items before modification due to the writes, but alternatively could be the data items after modification due to the writes), all writes to the data items (e.g., both initial and subsequent), or only last/final writes to the data items.

Referring again to FIG. 1, in some embodiments, the instruction set of the processor may optionally include an end memory write log instruction, and the processor may include logic 104 to perform the end memory write log instruction. By way of example, such logic may include a decode unit, or other unit or logic, to decode the end memory write log instruction, and an execution unit, or other unit or logic, to execute or perform the end memory write log instruction. In some embodiments, the execution or performance of the end memory write log instruction may cause the execution unit and/or the logic and/or the processor to stop or end the memory write logging, and to store information about the one or more logs, which were stored due to the begin memory write log instruction. In some embodiments, such information may include information indicative of an end and/or a size of the one or more logs. For example, such information may include one or more memory pointers, offsets, or other information indicative of one or more last or final memory locations where information (e.g., a memory address, data item, or time) was stored in the one or more logs.

In some embodiments, the instruction set may optionally include both the begin and end memory write log instructions, and the processor may optionally include both the logic 102 and the logic 104. In other embodiments, the instruction set may optionally include only either one (but not both) of the instructions, and only either one (but not both) of the logics 102, 104. As one example, the logic 104 to perform the end memory write log instruction may optionally be omitted, and the memory write logging due to the begin memory write log instruction may instead be ended in other ways. By way of example, the memory write logging may be ended upon expiration of a fixed or specified time (e.g., specified by the begin memory write log instruction), a fixed or specified number of writes or initial writes (e.g., specified by the begin memory write log instruction), when there are no further resources to continue to implement the memory write logging (e.g., no further resources to track initial writes), etc. As another example, the logic 102 to perform the begin memory write log instruction may optionally be omitted, and memory write logging may be initiated or begun in other ways. By way of example, multiple different instructions may be performed to begin the logging for different types of data, the logging may be performed by software, etc.

Figure 2:
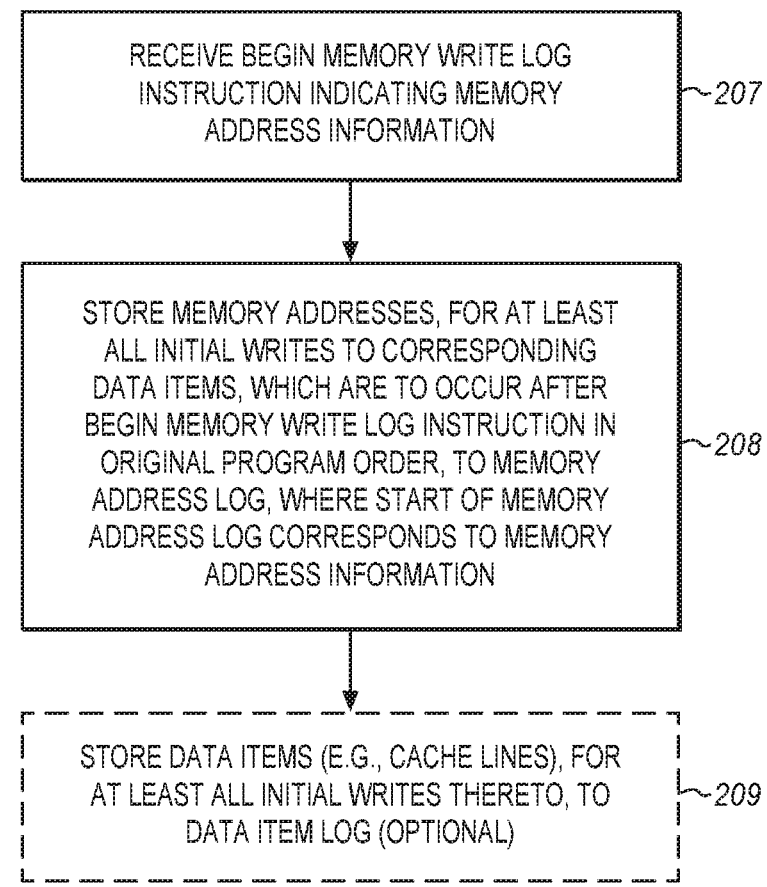
FIG. 2 is a block flow diagram of an embodiment of a method of performing an embodiment of a begin memory write log instruction.

FIG. 2 is a block flow diagram of an embodiment of a method 206 of performing an embodiment of a begin memory write log instruction. In various embodiments, the method 206 may be performed by a processor, instruction processing apparatus, digital logic device, or integrated circuit.

The method includes fetching or otherwise receiving the begin memory write log instruction, at block 207. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The begin memory write log instruction may specify or otherwise indicate at least one destination memory address information. The destination memory address information may be indicated in various different ways as discussed further below.

The method also includes storing memory addresses, in response to and/or due to the begin memory write log instruction, for at least all initial writes to corresponding data items (e.g., cache lines or portions of cache lines), which occur after the begin memory write log instruction in original program order, to a memory address log in memory, at block 208. A start of the memory address log may correspond to the destination memory address information (e.g., at a start of an addressed destination memory location). As used herein the term "log" broadly represents a digest or other data structure that is used to store information of interest (e.g., to a particular application).

In some embodiments, the method may optionally include storing the corresponding data items, in response to and/or due to the begin memory write log instruction, for at least all the initial writes to the corresponding data items, to a data item log in the memory, at block 209. As indicated by the dashed lines, storing the data items is optional not required. Other embodiments may optionally omit storing the data items.

In some embodiments, the memory addresses and corresponding data items may optionally only be stored for all the initial writes but not for any subsequent writes. For such embodiments, commonly the data items may represent the initial/original data items before modification due to the associated initial writes (but alternatively could be the modified data items after modification due to the associated initial writes). In other embodiments, the memory addresses and corresponding data items may optionally be stored for all writes (e.g., both all initial writes and all subsequent writes). In still other embodiments, the memory addresses and corresponding data items may optionally only be stored for the final writes (whether they are initial or subsequent).

Figure 4:
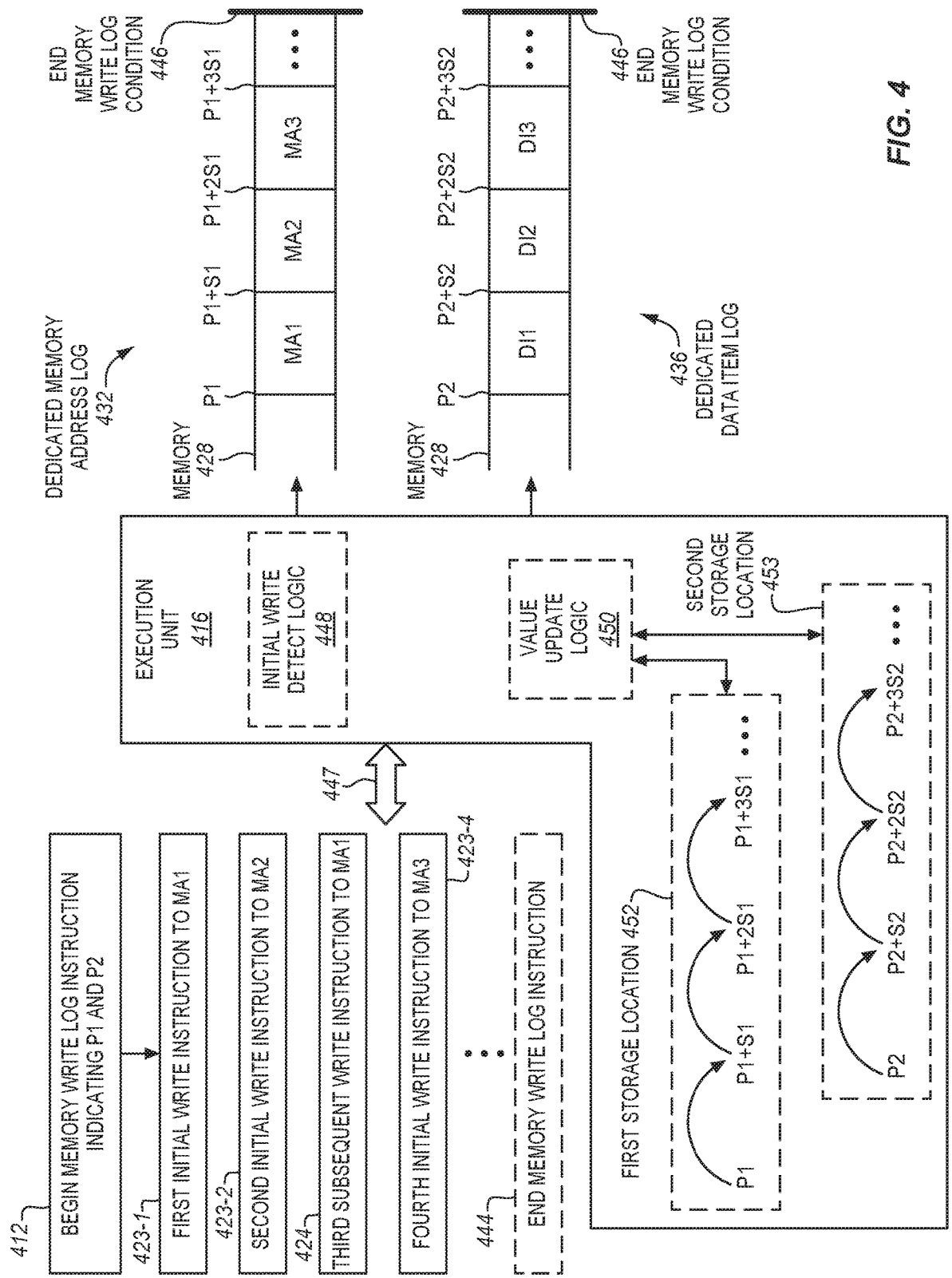
FIG. 4 is a block diagram of an embodiment of an execution unit to generate and store both an example embodiment of a dedicated memory address log, and an example embodiment of a dedicated data item log, in response to and/or due to an embodiment of a begin memory write log instruction.
Figure 5:
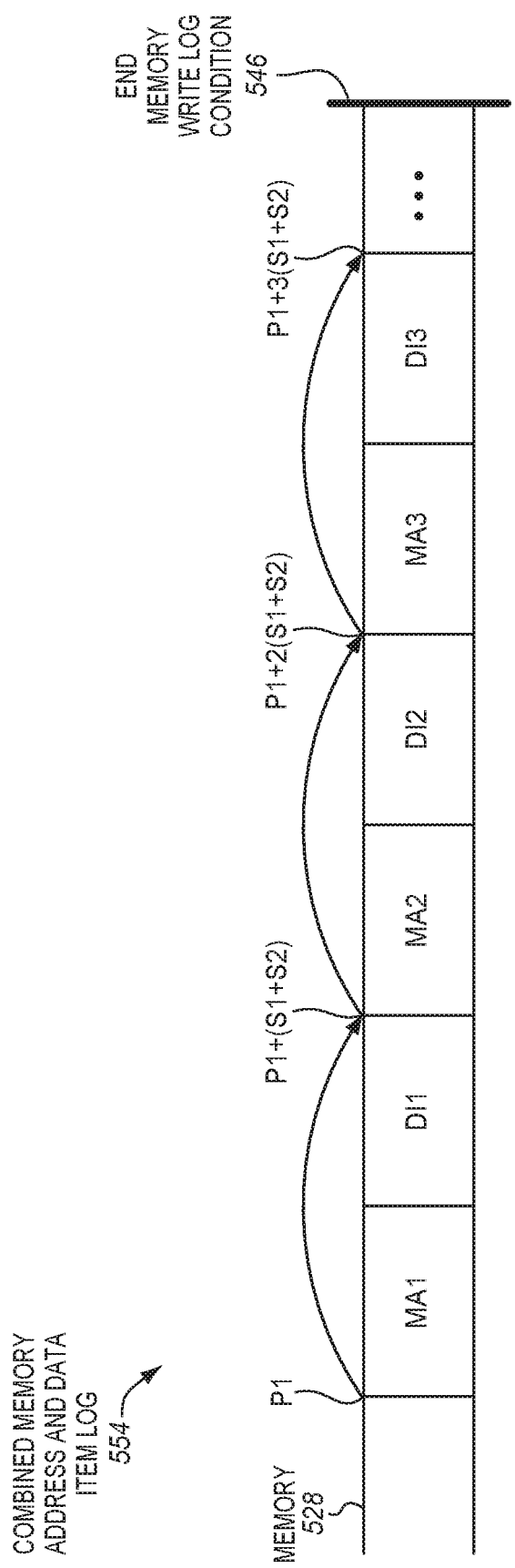
FIG. 5 is a block diagram of an example embodiment of a combined memory address and data item log.

In some embodiments, the data items may optionally be stored to a dedicated data item log that is separate or distinct from the memory address log. By way of example, the dedicated data item log and memory address logs shown and described further below for FIG. 4 are suitable, but are not required. Alternatively, both the memory addresses and data items may optionally be stored to a combined memory address and data item log. By way of example, the combined memory address and data item log shown and described further below for FIG. 5 is suitable, but is not required.

As used herein, storing the memory addresses, data items, and other data to a log encompasses both storing such data unaltered or untransformed as well as storing such data transformed, such as, for example, by compressing the data, encrypting the data, adding parity or other redundancy data to the data that is stored, or the like. In cases of such transformation of the data, the method may also optionally include transforming the data by compression, encryption, addition of redundancy, or the like.

The method has been described in a relatively basic form. However, operations may optionally be removed from and/or added to the method. For example, in another embodiment, storing the data items at block 209 may optionally be omitted and/or storing other data (e.g., times of the writes to memory) may optionally be added. As another example, the method may optionally include any one or more, or any combination, of: (1) updating one or more memory pointers, memory offsets, or other memory address related values; (2) determining whether a write to memory is an initial write to memory (after starting to perform the begin memory write log instruction) or a subsequent write to memory; and (3) detecting or determining whether an end memory write log condition has occurred. In some embodiments, the microarchitectural operations to detect or determine whether an end memory write log condition has occurred may optionally include one or more of: (1) detecting or determining if an end memory write log instruction has been performed; and (2) detecting or determining that there is a lack of additional resources available to continue to implement the begin memory write log instruction (e.g., to continue to track all initial writes to memory). In addition, while the flow diagram shows an order of operations according to embodiments, that order is exemplary. Alternate embodiments may perform certain of the operations in different order, combine certain operations, temporally overlap certain operations, etc. For example, the operations of blocks 208 and 209 may either be performed in the opposite order or at least partially concurrently.

Figure 3:
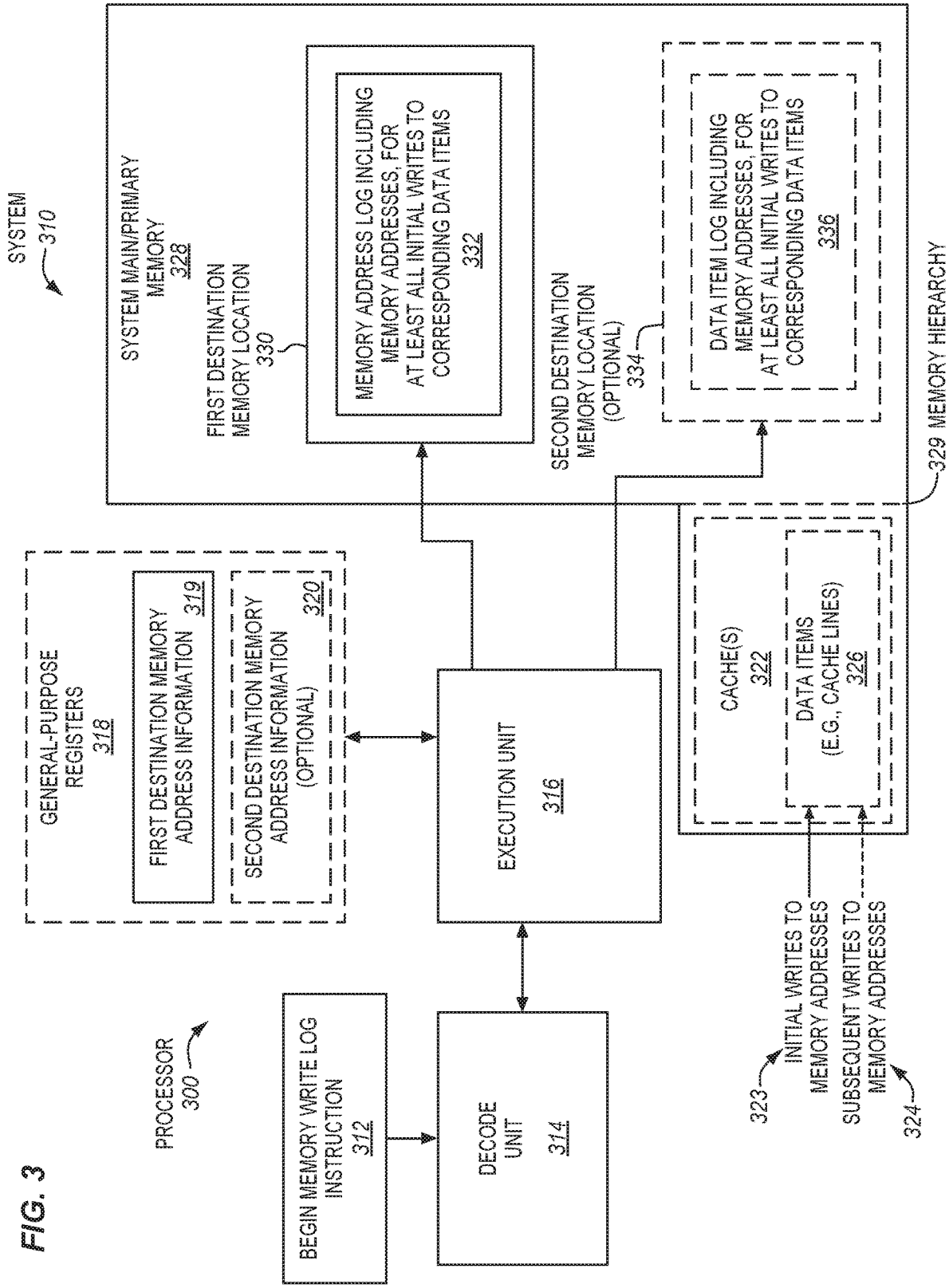
FIG. 3 is a block diagram of a system having an embodiment of a processor that is operative to perform an embodiment of a begin memory write log instruction.

FIG. 3 is a block diagram of a system 310 having an embodiment of a processor 300 that is operative to perform an embodiment of a begin memory write log instruction 312. In some embodiments, the processor 300 may be operative to perform the method 206 of FIG. 2. The components, features, and specific optional details described for the processor 300 may also optionally apply to the method 206. Alternatively, the method 206 may optionally be performed by and/or within a similar or different processor or apparatus. Moreover, the processor 300 may optionally perform methods the same as, similar to, or different than the method 206.

In various embodiments, the system 310 may represent a desktop computer, laptop computer, notebook computer, tablet computer, netbook, smartphone, server, network device (e.g., router or switch), smart television, television cable receiver, video game console, autonomous driving motor vehicle, or other type of computer system or electronic device.

The system includes the processor 300 and a memory hierarchy 329. The memory hierarchy may include one or more caches 322 (e.g., at one or more cache levels), system main or primary memory 328, and system secondary or backing storage (not shown). The system main or primary memory may include dynamic random-access memory (DRAM) or other conventional volatile memory, in some cases may optionally include optional non-volatile or persistent memory or storage representing a portion of the system main or primary storage, or a combination thereof. The processor and the system memory may be coupled, or otherwise in communication with one another, by any of various types of coupling mechanisms (e.g., through one or more buses, interconnects, hubs, memory controllers, chipset components, and combinations thereof). The processor may optionally be any of the various types previously described for FIG. 1 (e.g., a general-purpose or special purpose processor, have a CISC, RISC, or VLIW architecture). Although the processor is shown in the system in order to better illustrate certain concepts, it is to be appreciated that other embodiments pertain to the processor alone before inclusion in such a system (e.g., the processor without the system main or primary memory).

Referring again to FIG. 3, the processor may be coupled to receive the begin memory write log instruction 312 (e.g., from the system main or primary memory over a bus or other interconnect). The begin memory write log instruction may represent a macroinstruction, machine language instruction, machine code instruction, instruction that the processor is natively able to decode, or other instruction of an instruction set of the processor. In some embodiments, the begin memory write log instruction may explicitly specify (e.g., through one or more fields or a set of bits in the instruction encoding), or otherwise indicate (e.g., implicitly indicate), a first destination memory address information 319. The first destination memory address information may point to, address, or otherwise indicate (potentially along with other memory address information depending upon the memory addressing mode being used) a first destination memory location 330 in the system main or primary memory, where a memory address log 332 (i.e., a first log) is to be stored. In some embodiments, the begin memory write log instruction may optionally also explicitly specify or otherwise indicate a second destination memory address information 320, although this is not required. The second destination memory address information may point to, address, or otherwise indicate (potentially along with other memory address information depending upon the memory addressing mode being used) a second different destination memory location 334 in the system main or primary memory, where a data item log 336 (i.e., a second log) is to be stored. If one or more other dedicated logs are also optionally stored to store various other types of write related metadata or information disclosed herein, one or more additional destination memory address information may similarly be provided.

The first destination memory address information 319, and the optional second destination memory address information 320, may be of various different types and may be indicated in various different ways. Commonly, the memory address information may represent a memory pointer, a portion of a memory pointer, offset, or other information that can be used to derive or generate a memory address. As shown, in some embodiments, the first and optional second destination memory address information may optionally be stored in a set of general-purpose registers 318 of the processor. In such embodiments, the instruction may explicitly specify (e.g., through one or more bits in its encoding, a register specification field, etc.), or otherwise indicate (e.g., implicitly indicate), a first source general-purpose register that is used to store the first destination memory address information. Likewise, the instruction may explicitly specify or otherwise indicate a second source general-purpose register used to store the second destination memory address information.

To illustrate implicitly indicate, a fixed general-purpose register may optionally be implicit to the instruction (e.g., implicit to an opcode of the instruction), and the processor may implicitly or inherently understand to look in this implicit fixed general-purpose register for the memory address information when it recognizes the instruction (e.g., when it decodes the instructions opcode) without the instruction needing to have any non-opcode bits to specify the register. The begin memory write log instruction may have an opcode, sometimes called an operation code (e.g., a set of bits or one or more fields), to identify the instruction and/or the operation to be performed (e.g., a begin memory write log operation). Alternatively, one or more of the first and optional second destination memory address information may optionally be provided in an immediate of the instruction, or otherwise provided. Depending upon the memory addressing mode being used, the first and optional second destination memory address information may each optionally be combined with additional memory address information to generate full memory addresses that identify the destination memory locations. Such additional memory address information may be stored in another register (e.g., a data segment register, extended segment register, or other memory address register), in the encoding of the instruction, or otherwise provided.

Each of the general-purpose registers 318 may represent an on-die and/or on integrated circuit storage location that is operative to store data. The registers may represent architecturally-visible or architectural registers that are visible to software and/or a programmer and/or are the registers that may be indicated by instructions of the instruction set of the processor to identify operands. The registers may be implemented in different ways in different microarchitectures and are not limited to any type of design. Examples of suitable types of registers include, but are not limited to, dedicated physical registers, dynamically allocated physical registers using register renaming, and combinations thereof.

Referring again to FIG. 3, the processor includes a decode unit or decoder 314. The decode unit may be coupled to receive, and may be operative to decode, the begin memory write log instruction. The decode unit may output one or more relatively lower-level instructions or control signals (e.g., one or more microinstructions, micro-operations, micro-code entry points, decoded instructions or control signals), which reflect, represent, and/or are derived from the relatively higher-level begin memory write log instruction. In some embodiments, the decode unit may include at least one input structure (e.g., a port, interconnect, or interface) coupled to receive the begin memory write log instruction, an instruction recognition and decode logic coupled therewith to recognize and decode the begin memory write log instruction, and at least one output structure (e.g., a port, interconnect, or interface) coupled therewith to output the lower-level instruction(s) or control signal(s). The decode unit and/or its instruction recognition and decode logic may be implemented using various instruction decode mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may include at least some hardware (e.g., one or more of transistors, integrated circuitry, on-die read-only memory or other non-volatile memory storing microcode, microinstructions, or other low-level or hardware-level instructions or control signals). In some embodiments, the decode unit may be included on a die, integrated circuit, or semiconductor substrate.

In some embodiments, instead of the begin memory write log instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the begin memory write log instruction, which may be of a first instruction set, and may emulate, translate, morph, interpret, or otherwise convert the begin memory write log instruction into one or more corresponding intermediate instructions or control signals, which may be of a second different instruction set. The one or more intermediate instructions or control signals of the second instruction set may be provided to the decode unit, which may decode them into one or more lower-level instructions or control signals executable by native hardware of the processor (e.g., one or more execution units).

Referring again to FIG. 3, an execution unit 316 is coupled with the decode unit 314 to receive the one or more decoded or otherwise converted instructions or control signals that represent and/or are derived from the begin memory write log instruction. In some embodiments, the execution unit may be on a die or integrated circuit (e.g., with the decode unit). The execution unit may also be coupled to receive the first destination memory address information 319, and the optional second destination memory address information 320. For example, the execution unit may be coupled with the general-purpose registers 318 if the first and/or optional second memory address information is stored therein. When deployed in the system the execution unit may be coupled with the system main or primary memory 328. The execution unit may be operative in response to and/or due to the begin memory write log instruction (e.g., in response to the one or more instructions or control signals decoded from the instruction and/or in response to the instruction being decoded and/or in response to the instruction being provided to a decoder) to begin and continue to log, record, or otherwise store information about at least some writes to memory, which are to occur after the begin memory write log instruction in original program order, to one or more logs, until an end memory write log condition occurs.

In some embodiments, the execution unit and/or the processor, in response to and/or due to the begin memory write log instruction, may begin and continue to log, record, or otherwise store memory addresses, for at least all initial writes 323 to corresponding memory data items 326 (e.g., cache lines), which occur after the begin memory write log instruction in the original program order, to a memory address log 332, until the end memory write log condition occurs. The memory address log may effectively log, record, or store what or which data items (e.g., cache lines) were written to (e.g., modified) by at least the initial writes. Examples of suitable memory address logs include, but are not limited to, the dedicated memory address log 432 of FIG. 4 and the combined memory address and data item log 554 of FIG. 5, although the scope of the invention is not so limited.

In some embodiments, a start of the memory address log may correspond to the first destination memory address information 319. In the illustrated embodiment, the memory address log is optionally stored non-temporally directly to main or primary memory 328 (e.g., DRAM or other volatile memory, optionally a non-volatile or persistent memory representing a portion of main or primary memory, or a combination thereof) bypassing the one or more caches 322. In one such embodiment, the instruction may optionally have one or more bits or a field to explicitly specify, or may implicitly indicate, whether the log is to be stored directly to non-volatile or persistent memory (e.g., this may be advantageous if the logging is optionally performed to assist with non-volatile data checkpointing). In other embodiments, the memory address log may optionally be temporarily stored in the one or more caches 322. In one such embodiment, the instruction may optionally have one or more bits or a field to explicitly specify, or may implicitly indicate, a level of the memory hierarchy (e.g., a cache level or directly to the system main/primary memory) where the memory address log is to be stored. In one embodiment, if the log is to be stored in the one or more caches, the instruction may be able to explicitly specify or implicitly indicate in similar ways a synchronous or asynchronous flushing attribute for the data of the log (e.g., whether it is to stay in the cache or can be written to memory through normal cache line eviction mechanisms). Alternatively, one or more of such types of information may instead optionally be stored in a register of the processor (e.g., a memory type range register (MTRR) or other such control or configuration register). These aspects may also optionally be used for the other types of logs disclosed herein.

In some embodiments, the execution unit and/or the processor, in response to and/or due to the begin memory write log instruction, may begin and continue to log, record, or otherwise store memory data items, for at least all the initial writes 323 to the memory data items, which occur after the begin memory write log instruction in original program order, to a second log (e.g., a data item log), until the end memory write log condition occurs. In some embodiments, the memory data items may represent cache lines. Alternatively, the memory data items may optionally represent at least a portion of a cache line (e.g., half a cache line, a vector register sized portion of a cache line, an individual data element of a cache line). For example, the memory address log may log, record, or store the initial values of the data items (e.g., the initial cache line contents) before being changed due to the initial writes. Examples of suitable data item logs include, but are not limited to, the dedicated data item log 436 of FIG. 4 and the combined memory address and data item log 554 of FIG. 5, although the scope of the invention is not so limited.

As shown, in some embodiments, the data item log 336 may optionally represent a separate or distinct log dedicated to storing the data item but not the memory addresses. In such embodiments, a start of the data item log may correspond to the optional second destination memory address information 320. As previously described for the memory address log, in various embodiments, the data item log may optionally be stored directly to the main or primary storage 328 or may optionally be stored in the one or more caches 322. In other embodiments, data item log may optionally represent a combined memory address and data item log that is used to store both the memory addresses and the data items. As used herein, the combined memory address and data item log represents both a memory address log and a data item log. A start of the combined memory address and data item log may correspond to the first destination memory address information 319 (e.g., start at an addressed first destination memory location 330 although it may potentially be initially cached in the one or more caches). In such an embodiment, the second destination memory address information 320 may optionally be omitted (unless it is optionally used for a time log or to log other types of information).

The initial writes 323 may represent the first or initial writes to the memory data items, which occur after the begin memory write log instruction in original program order (e.g., after beginning to perform the memory write logging due to the begin memory write log instruction), but within the memory write logging period or operations due to the begin memory write log instruction. The initial writes are contrasted to sequential writes 324, which represent the second or subsequent writes to the same memory data items, which occur after the begin memory write log instruction in original program order, also within the memory write logging period or operations due to the begin memory write log instruction. For example, in embodiments where a memory data item is at least a portion of a cache line, an initial write may cause a transition of the cache line from a clean state (e.g., a shared or exclusive state in the MESI (modified, exclusive, shared, invalid) and MOESI (modified, owned, exclusive, shared, invalid) cache coherency protocols) to a dirty state (e.g., a modified state in the MESI or MOESI protocols). In contrast, the subsequent writes, may write to cache lines that have already been written to (e.g., are already in modified or other dirty state).

In some embodiments, the memory addresses, and optionally the memory data items, may be logged or stored for only all the initial writes to the data items, within the memory write logging operations due to the begin memory write logging instruction. For such embodiments, commonly the data items may represent the initial/original data items before modification due to the associated initial writes (but alternatively could be the modified data items after modification due to the associated initial writes). In such embodiments, neither memory addresses nor data items may be stored for any subsequent writes to the data items, within the memory write logging operations due to the begin memory write logging instruction. For example, the memory addresses and original cache line contents of cache lines that are modified multiple times, within the memory write logging operations of a begin memory write log instruction, may only be logged once for the first or initial modification. Alternatively, in other embodiments, the memory addresses, and optionally the memory data items, may optionally be logged or stored for all writes (e.g., both all initial writes to the data items, as well as for any subsequent writes to the data items), within the memory write logging operations due to the begin memory write logging instruction. In still other embodiments, the memory addresses, and optionally the memory data items, may optionally be logged or stored only for the final or last writes to the data items before the end of the logging period. In such an embodiment, the data items may be the cache lines or other data items modified or at least stored by the final or last writes. For example, sequentially modified versions of a cache line may be stored for each time the cache line is modified. In some embodiments, only writes from a single corresponding core, hardware thread, or other logical processor may be logged responsive to the instruction. In other embodiments, writes from multiple logical processors may be performed responsive to the instruction (e.g., logging may be initiated when a controlling thread performs the instruction, and the controlling thread may signal other threads to coordinate the logging).

As used herein, storing the memory addresses, data items, and other data to a log, encompasses both storing such data unaltered or untransformed, as well as storing such data transformed, such as, for example, by compressing the data, encrypting the data, adding parity or other redundancy data to the data that is stored, or the like. In other words, the log is still considered to store a memory address even if the memory address has first had parity bits added and then the memory address and the parity bits have been compressed by a compression algorithm prior to storage. In cases where such transformation of the data is used, the execution unit may direct the data to be logged to such transformation logic (e.g., encryption logic, compression logic, parity logic, etc.).

In some embodiments, the memory write logging begun or turned on by the begin memory write log instruction may continue until an end memory write log condition occurs. One example of suitable end memory write log condition is performance of an embodiment of an end memory write log instruction as disclosed elsewhere herein. The begin memory write log instruction may effectively mark the beginning of a code region to be monitored/tracked for writes by turning on the memory write logging mechanism or operations, and the end memory write log instruction may effectively mark the end of the code region. Another example of suitable end memory write log condition is a lack of additional available resources to further implement the memory write logging (e.g., lack of additional available resources to continue to track a write-set of data items and/or to keep track of all initial writes). In some embodiments, the execution unit of the begin memory write log instruction and/or the processor may be able to determine if/when there is such a lack of additional available resources, and to end the memory write logging when there is. Still other examples of suitable end memory write log conditions is performance of a given number of writes or initial writes (e.g., a fixed, instruction implicit, or instruction specified number), or expiration of a given amount of time that the memory write logging has been performed (e.g., a fixed, instruction implicit, or instruction specified number), or due to memory access violations or exceptions, etc.

The execution unit 316 and/or the processor may include specific or particular logic (e.g., transistors, integrated circuitry, or other hardware potentially combined with firmware (e.g., instructions stored in non-volatile memory) or potentially an optional lesser amount of software) that is operative to perform the begin memory write log instruction and/or store the log(s) in response to and/or due to the begin memory write log instruction. The term "execution unit" as used herein, broadly represents the logic or collection of logic to execute, implement, or perform at least the corresponding instruction. The term execution unit does not imply, and is not limited to, a single discrete unit to perform all operations to implement the instruction. Rather, such operations may potentially be performed by distributed logic (e.g., that is distributed throughout two or more units or components or across the processor) but collectively represents the execution unit to perform the instruction. In some embodiments, the execution unit may include the logic shown and described for any one or more of FIGS. 11-12, which are illustrative examples of suitable micro-architectural arrangements, although the scope of the invention is not so limited. Typically, for the begin memory write log instruction, the execution unit is contained within a memory execution unit and/or the memory subsystem of the processor. Accordingly, in some embodiments, the memory execution unit and/or the memory subsystem of the processor may be said to be the entity to execute or perform the begin memory write log instruction.

Generally, enough space should be allocated in the system main or primary memory for the one or more logs to be stored so that the one or more logs don't exceed the intended space and overwrite unintended data. In some embodiments, a minimum size for the memory space may optionally be required for applications to use the begin memory write log instruction. For example, the minimum sizes may be determined based on processor identification information (e.g., a CPUID instruction), although this is not required.

To avoid obscuring the description, a relatively simple processor 300 has been shown and described. However, the processor may optionally include other processor components. For example, various embodiments may include various combinations and configurations of the components shown and described for any of FIGS. 16-19. All the components of the processor may be coupled together to allow them to operate as intended. By way of example, considering FIG. 17B, any one or more of the instruction cache unit 1734 may cache instructions including the begin memory write log instruction, and/or the instruction fetch unit 1738 may fetch instructions including the begin memory write log instruction, and/or the scheduler unit 1756 may schedule operations associated with instructions including the begin memory write log instruction, and/or the retirement unit 1754 may retire instructions including the begin memory write log instruction.

FIG. 4 is a block diagram of an embodiment of an execution unit 416 to generate and store both an example embodiment of a dedicated memory address log 432, and an example embodiment of a dedicated data item log 436, in response to and/or due to an embodiment of a begin memory write log instruction 412. The execution unit may start to perform the begin memory write log instruction. The begin memory write log instruction may indicate first destination memory address information corresponding to a first starting memory location (P1) where the dedicated memory address log is to be stored, and optionally second destination memory address information corresponding to a second starting memory location (P2) where the dedicated data item log is to be stored. The begin memory write log instruction may cause the execution unit to begin and continue to log information for, in this example, initial memory writes in the dedicated memory address log, and the dedicated memory address log, as the initial memory writes occur over time, until an end memory write log condition 446 occurs.

By way of example, a first initial write instruction 423-1 may be performed to a first memory address (MA1) corresponding to a first cache line or other data item (DI1), then a second initial write instruction 423-2 may be performed to a second different memory address (MA2) corresponding to a second different data item (DI2), then a third subsequent write instruction 424 may be performed to the same first memory address (MA1) corresponding to the same first data item (DI1), then a fourth initial write instruction 423-4 may be performed to the a third still different memory address (MA3) corresponding to a third still different data item (DI3), and so on, until the end memory write log condition 446 occurs (e.g., in some embodiments an optional end memory write log instruction 444 is performed). The write instructions may represent various different types of instructions that write to memory, such as, for example, scalar write, store, or move to memory instructions, vector or packed data store instructions, scatter instructions, and the like. The period of time between starting to perform the begin memory write log instruction, and the occurrence of the end memory write log condition, represents the memory write logging period for the begin memory write log instruction.

As shown by the arrow 447, the execution unit 416 may be operative to detect, observe, become notified of (e.g., be signaled about), or otherwise become aware of, in this example, at least all initial writes to memory. In some embodiments, the execution unit may optionally have initial write detect logic 448 to detect these initial writes. The execution unit may generate and store the dedicated memory address log 432, and the dedicated data item log 436, in the memory 428. The dedicated memory address log may be dedicated to storing only the memory addresses (MAs). Similarly, the dedicated data item log may be dedicated to storing only the data items (DIs). Further, in this example embodiment, the dedicated memory address log, and the dedicated data item log, respectively, are only to store the memory addresses and data items for all initial writes (e.g., the first 423-1, second 423-2, and fourth 423-4 initial write instructions), but not for any subsequent writes (e.g., not for third subsequent write instruction 424), although this is not required for other embodiments. Notice that the first, second, and fourth initial write instructions each write to a different memory address that corresponds to a different data item, whereas the third subsequent write instruction writes to the same first memory address (MA1) and the same data item as the first initial write instruction.

As shown in the illustrated example embodiment, the execution unit may store the first memory address (MA1) to the dedicated memory address log 432 at the starting memory location P1, and store the first data item (DA1) to the dedicated data item log 436 at the starting memory location P2, when the first initial write instruction 423-1 is performed. Commonly, the first data item (DA1), as well as the other data items, may represent the initial/original data items before modification due to the associated initial writes. This may allow capturing the initial/original data items. Alternatively, the modified data items after modification due to the associated initial writes may instead be logged. Each of the memory addresses (MAs) may have a size in bits (S1), such as 16-bits, 32-bits, or 64-bits, or another suitable number. Similarly, each of the data items (DIs) may have a size in bits (S2), such as 256-bits, 512-bits, 1024-bits, 2048-bits, or another suitable number of bits (e.g., for a cache line). Subsequently, the execution unit may append or store the second memory address (MA2) at a consecutive memory location P1+S1 in the log 432, which is offset from P1 by the size (S1) of the memory address MA1, when the second initial write instruction 423-2 is performed. Analogously, the execution unit may append or store the second data item (DI2) at a consecutive memory location P2+S2, which is offset from P2 by the size (S2) of the data item DI1, when the second initial write instruction 423-2 is performed. In this embodiment where logging is only performed for initial writes, the execution unit may not store the first memory address (MA1) again, and may not store the first data item (DI1) again, when the third subsequent write instruction 424 is performed to the same first memory address (MA1). Then, the execution unit may append or store the third memory address (MA3) at the next consecutive memory location P1+2S1, and may append or store the third data item (DI3) at the next consecutive memory location P2+2S2, when the fourth initial write instruction 423-4 is performed. This may generally continue until the occurrence of the end memory write log condition 446.

Notice that, in some embodiments, the memory addresses may optionally be stored in a same positional order in the memory address log as the temporal order that the associated writes occur over time (e.g., MA1, MA2, and MA3 may be stored in the same positional order in the memory address log as the temporal order in which the first, second, and fourth initial write instructions were performed in time). Similarly, in some embodiments, the data items may optionally be stored in a same positional order in the data item log as the temporal order that the associated writes occur over time. Each time an initial write occurs during the memory write log period, the corresponding memory address may be appended or otherwise stored at a running end of the memory address log, and the corresponding original/initial data item may be appended or otherwise stored at a running end of the data item log. Also, in the case of the dedicated memory address log (e.g., which is only used to store memory addresses), the memory addresses may be appended or stored consecutively, one after the other, to consecutive memory locations, which are each of the same size (S1) as the memory addresses. For example, the most significant bit of MA1 may be in an adjoining bit position to the least significant bit of MA2. Similarly, in the case of the dedicated data item log (e.g., which is only used to store data items), the data items may be appended or stored consecutively, one after the other, to consecutive memory locations, which are each of the same size (S2) as the data items.

In some embodiments, the execution unit, in response to and/or due to the begin memory write log instruction, may also be operative to increment, decrement, or otherwise update a first pointer, offset, or other first value to account for each memory address stored to the dedicated memory address log. In some embodiments, the execution unit may have value update logic 450 to update the first value. The first value may be indicative of and/or used to derive the running memory location that represents the running end of the dedicated memory address log, where a next memory address is to be stored. Initially, the first value, corresponding to the first starting memory location P1, may be obtained or derived from the destination memory address information indicated by the begin memory write log instruction. In some embodiments, this initial first value may be stored in a first storage location 452 (e.g., a temporary register or other storage location within or at least accessible to the execution unit). Each time an additional memory address is stored to the memory address log, the value update logic 450 may increment, decrement, or otherwise updated the first value by the size of the memory address. This may be done in different ways, such as, for example, by changing the first value by 64 for 64-bits, 8 for 8-bytes, 4 for 4-halfwords, 2 for 2-words, or 1 for 1-memory address). For example, as shown in the illustration, P1 may be updated to (P1+S1) when MA1 is stored, then (P1+S1) may be updated to (P1+2S1) when MA2 is stored, and then (P1+2S1) may be updated to (P1+3S1) when MA3 is stored. In this way, the execution unit may maintain the first value consistent with the running or advancing end of the dedicated memory address log, so that it knows where to store the next memory address for the next initial write.

Similarly, in some embodiments, the execution unit, in response to and/or due to the begin memory write log instruction, may also be operative to increment, decrement, or otherwise update a second pointer, offset, or other second value to account for each data item stored to the dedicated data item log. The second value may be indicative of and/or used to derive the memory location that represents the running or advancing end of the dedicated data item log where a next data item is to be stored. Initially, the second value corresponding to the second starting memory location P2 may be obtained or derived from destination memory address information indicated by the begin memory write log instruction. In some embodiments, the initial second value may be stored in a second storage location 453 (e.g., a second temporary register or other storage location within or at least accessible to the execution unit). Each time an additional data item is stored to the dedicated data item log, the second value in the second storage location may be updated by the size of the data item. For example, as shown in the illustration, P2 may be updated to (P2+S2) when DI1 is stored, then (P2+S2) may be updated to (P2+2S2) when DI2 is stored, and then (P2+2S2) may be updated to (P2+3S2) when DI3 is stored. In this way, the execution unit may maintain the second value consistent with the running or advancing end of the dedicated data item log so that it knows where to store the next data item for the next initial write.

FIG. 5 is a block diagram of an example embodiment of a combined memory address and data item log 554 that may be stored by an execution unit and/or a processor in response to and/or due to a begin memory write log instruction. The combined memory address and data item log may be stored in a memory 528 at a starting memory location (P1), which may correspond to destination memory address information indicated by the begin memory write log instruction. The combined memory address and data item log may store both memory addresses (MAs) of a first size (S1) and data items (DIs) of a second size (S2). The previously described sizes are suitable but not required. In some embodiments, logging may optionally only be performed for all initial writes occurring within the memory write log period. In other embodiments, the logging may optionally be performed for both all initial writes and all subsequent writes occurring within the memory write log period.

As shown in the illustrated example embodiment, a first pair of a first memory address (MA1), and a first corresponding data item (DA1), may be stored in the combined memory address and data item log, at the starting memory location P1, when an earliest initial write instruction is performed. Subsequently, a second pair of a second memory address (MA2), and a second corresponding data item (DA2), may be appended or otherwise stored at a next consecutive memory location P1+S1+S2, when a next sequential initial write instruction is performed. P1+S1+S2 is offset from P1 by a combination of the first size (S1) of the first memory address (MA1) and the second size (S2) of the first data item (DA1). Then, a third pair of a third memory address (MA3), and a third corresponding data item (DA3), may be appended or otherwise stored, at a consecutive memory location P1+2(S1+S2), when a next sequential initial write instruction is performed. This process may generally continue until an occurrence of an end memory write log condition 546. In the illustrated example, the memory addresses are stored first followed by the data items, although the opposite convention may also optionally be used. Notice that, in some embodiments, the pairs of memory addresses and corresponding data items may optionally be stored in a same positional order in the memory address log as the temporal order that the associated writes occur over time. Also, the corresponding pairs of memory addresses and data items may be appended or stored consecutively, one after the other, to consecutive memory locations, which are each of the same combined size of the memory addresses plus the data items.

In some embodiments, the execution unit and/or the processor, in response to and/or due to the begin memory write log instruction, may also update a pointer, offset, or other value to account for each corresponding pair of a memory address and data item stored. The value may be indicative of and/or used to derive the memory location where the next pair is to be stored. This may be done substantially as previously described except that the value may be updated by the combined size of a memory address and a data item (e.g., S1+S2) for each pair stored.

Figure 6:
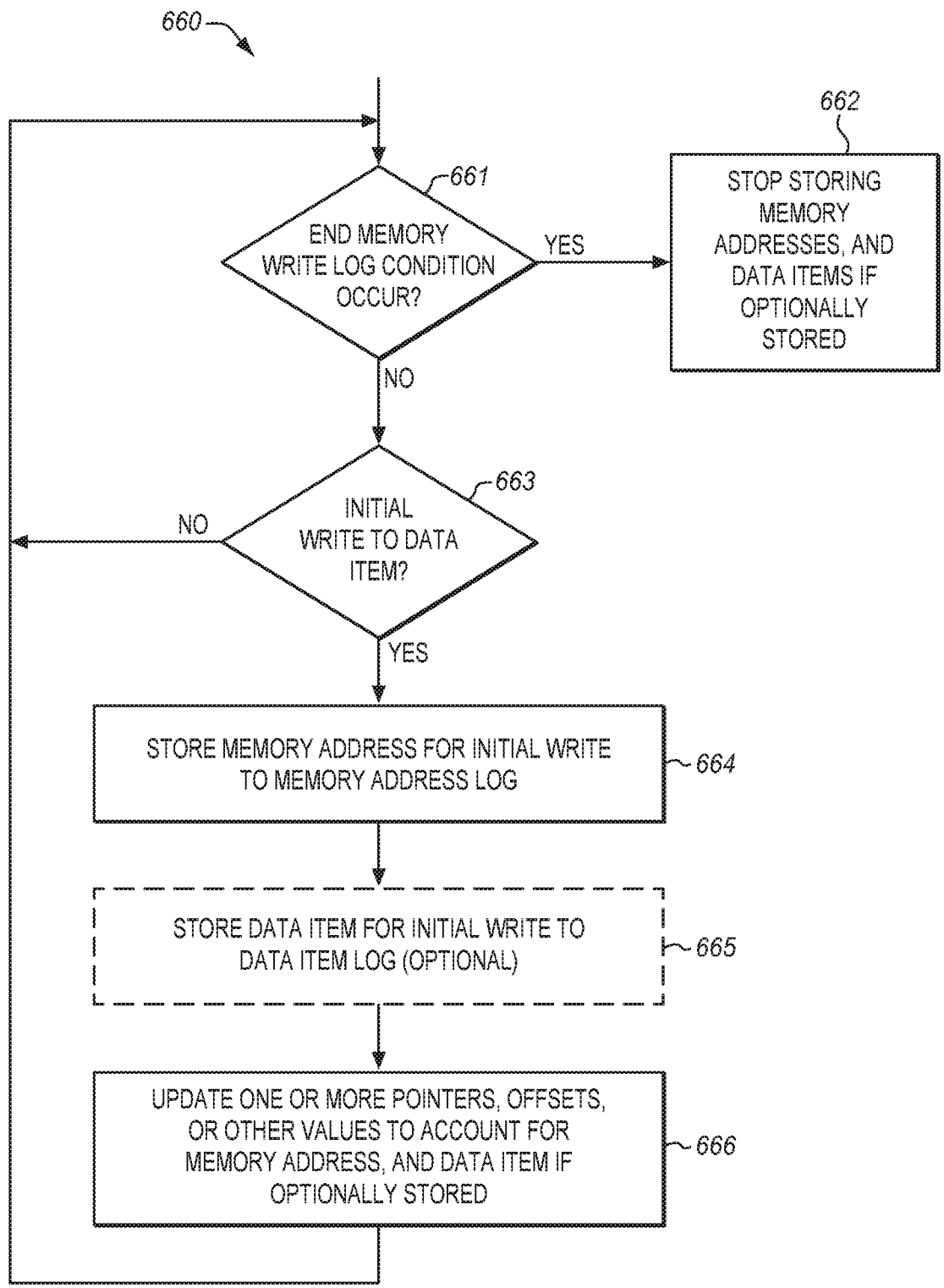
FIG. 6 is a block flow diagram of an embodiment of a method of storing memory addresses to a memory address log, and optionally storing data items to a data item log.

FIG. 6 is a block flow diagram of an embodiment of a method 660 of storing memory addresses to a memory address log, and optionally storing data items to a data item log. In some embodiments, the method may be performed during performance of a begin memory write log instruction. In some embodiments, the method 660 may optionally be used to implement blocks 208 and 209 of FIG. 2, although the scope of the invention is not so limited.

At block 661, a determination may be made whether an end memory write log condition has occurred. If it has occurred (i.e., "yes" is the determination), the method may advance to block 662. At block 662, the method may stop storing memory addresses, and data items if they are optionally being stored. Alternatively, if the end memory write log condition has not occurred (i.e., "no" is the determination), the method may advance to block 663.

At block 663, a determination may be made whether an initial write is being performed to a cache line or other data item. In some embodiments, this may include distinguishing initial writes from subsequent writes. If an initial write is not being performed (i.e., "no" is the determination), the method may revisit or return to block 661. Alternatively, if an initial write is being performed (i.e., "yes" is the determination), the method may advance to block 664.

At block 664, the memory address for the initial write to the data item may be stored to a memory address log. At block 665, the data item for the initial write may optionally be stored to a data item log (if data items are optionally being stored). As previously mentioned, commonly the data items stored may be the original/initial data items prior to modification due to the associated initial writes, although this is not required. The previously described memory address logs and data item logs are suitable, but are not required.

Then, at block 666, one or more pointers, offsets, or other values may be updated to account for the memory address, and the data item if optionally stored. This may be performed substantially as previously described. The method may then return or revisit block 661.

Figure 7:
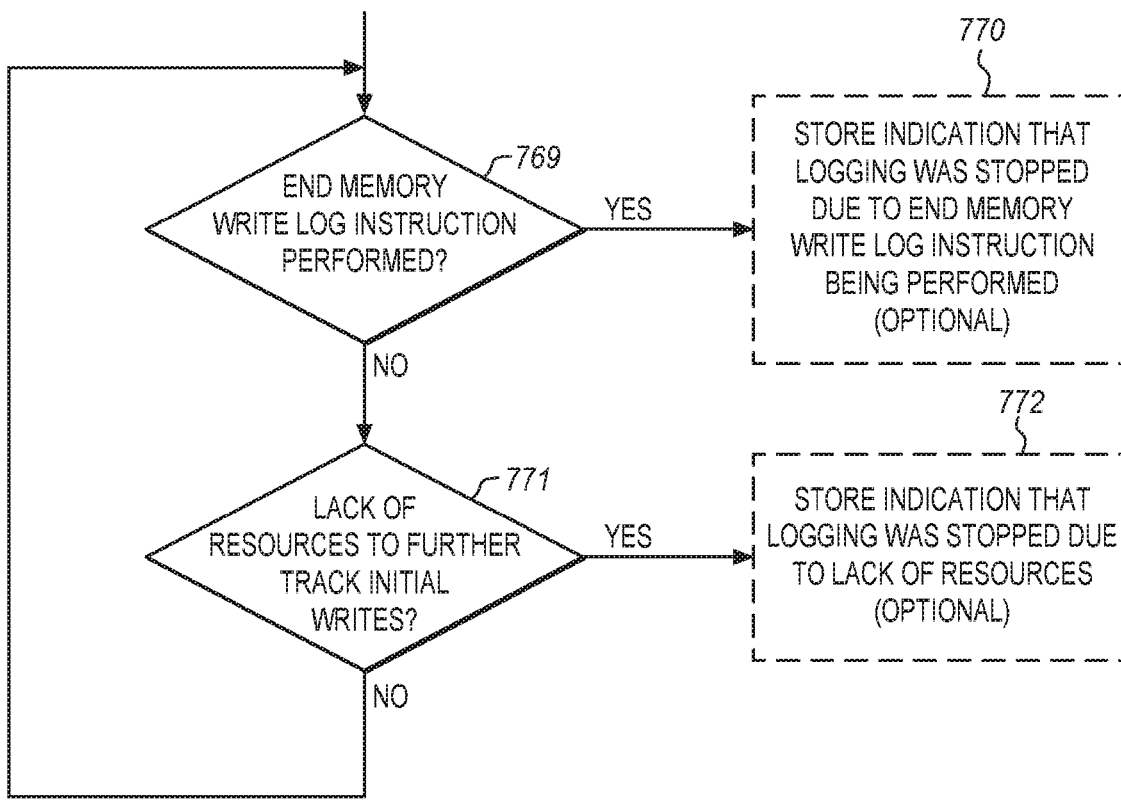
FIG. 7 is a block flow diagram of an embodiment of a method of determining whether an end memory write log condition has occurred.

FIG. 7 is a block flow diagram of an embodiment of a method 768 of determining whether an end memory write log condition has occurred. In some embodiments, the method may be performed during performance of a begin memory write log instruction. In some embodiments, the method 768 may optionally be used to implement block 661 of FIG. 6, although the scope of the invention is not so limited.

At block 769, a determination may be made whether an end memory write log instruction is being performed. If it is being performed (i.e., "yes" is the determination), the method may advance to block 770. At block 770, an indication may optionally be stored in an architecturally-visible storage location that logging was stopped due to the end memory write log instruction being performed. Examples of suitable architecturally-visible storage locations include, but are not limited to, an architecturally-visible register of the processor (e.g., a general-purpose register, a flags, status, or condition code register that is used to store a plurality of flags, status bits, or condition code bits) and a memory location in main memory. As one example, a given flag (e.g., either a new flag or a repurposed existing flag) may be configured to a first value (e.g., set to binary one) to indicate that logging was stopped due to performance of the end memory write log instruction. Alternatively, if the end memory write log instruction is not being performed (i.e., "no" is the determination at block 769), the method may advance to block 771.

At block 771, a determination may be made whether there is a lack of additional resources available to further track all initial writes. This may also broadly represent a determination of whether there is a lack of additional resources to continue to perform the begin memory write log instruction. If there is a lack of additional resources (i.e., "yes" is the determination), the method may advance to block 772. At block 772, an indication may be stored in either the same or different architecturally-visible storage location that logging was stopped due to a lack of additional resources. The previously mentioned types of architecturally-visible storage locations are suitable but are not required. As one example, optionally the same given flag may be configured to a second different value (e.g., cleared to binary zero) to indicate that logging was stopped due to the lack of resources. The method may then revisit or return to block 769.

Figure 8:
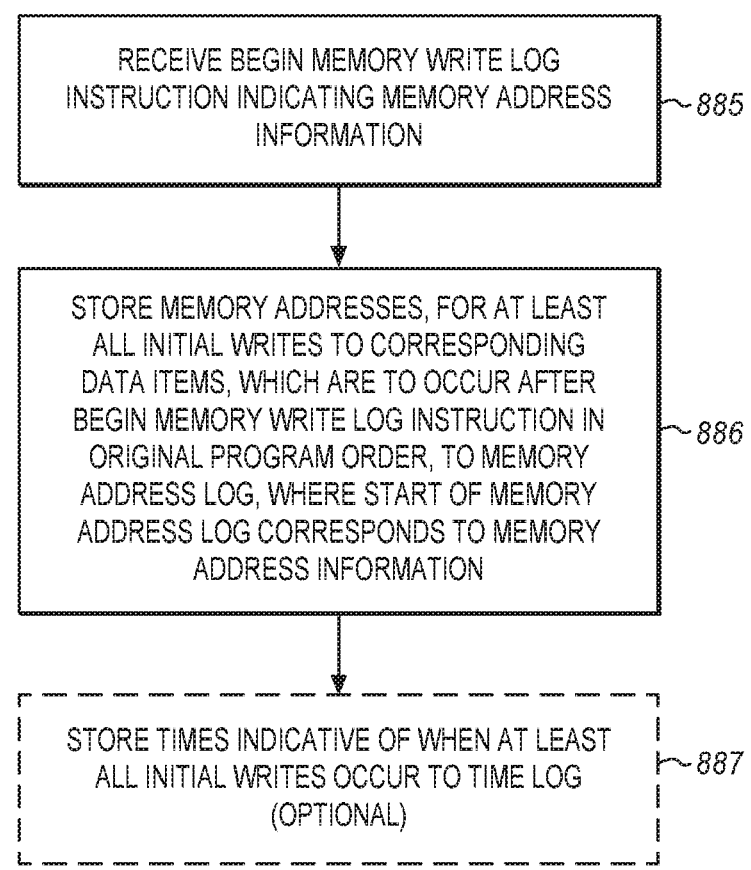
FIG. 8 is a block flow diagram of another embodiment of a method of performing another embodiment of a begin memory write log instruction.

FIG. 8 is a block flow diagram of another embodiment of a method 884 of performing another embodiment of a begin memory write log instruction. At block 885, the begin memory write log instruction may be fetched or otherwise received. This may optionally be performed similar to, or the same as, previously described for block 207 of FIG. 2. The begin memory write log instruction may specify or otherwise indicate at least one destination memory address information.

The method also includes storing memory addresses, for at least all initial writes to corresponding data items, which are to occur after the instruction in original program order, to a memory address log, at block 886. A start of the memory address log may correspond to the destination memory address information indicated by the instruction. These may be performed similar to, or the same as, previously described for block 208 of FIG. 2.

At block 887, times indicative of when at least all initial writes occur may optionally be stored to a time log. For example, the execution unit for the begin memory write log instruction may access or otherwise receive the times from a timer of the processor at the times the initial writes are being performed (e.g., immediately before, during, or immediately after), and store them to the time log. The times may optionally either be stored to a combined log (e.g., that also stores memory addresses and/or data items) or a dedicated time log that is dedicated to storing only the times. In the latter case, the begin memory write log instruction may specify or otherwise indicate a second additional destination memory address information corresponding to a start of the dedicated time log.

One possible advantage of storing the times is that they may be helpful when analyzing timing related aspects. As one example, they may be helpful when the logs are used to debug unexpected program state changes due to multithreading (e.g., cooperative multithreading). By way of example, if a first thread modifies the state of a shared variable from A1 to A2 (e.g. A2=A1+1) non-atomically by mistake, and if another thread then changes the state of the shared variable to B between the read of value A1 and write of A2, then this buggy state transition (B→A2) can be identified through the memory addresses. Also storing the time when the clean-to-dirty transition happened may give a debugger additional insight into what happened by enabling correlation with the work that done by other threads during this time span.

The method has been described in a relatively basic form. However, operations may optionally be removed from and/or added to the method. For example, in another embodiment, storing the times at block 209 may optionally be omitted and/or storing other data (e.g., the corresponding data items of the writes) may optionally be added. As another example, the operations of blocks 886 and 887 may optionally be performed by an analogous method to that of FIG. 6, except that times may optionally be stored instead of the data items at block 665, although this is not required. In such an example, the operation at block 661 may optionally be performed by the method of FIG. 7, although this is not required. In addition, while the flow diagram shows an order of operations according to embodiments, alternate embodiments may perform certain of the operations in different order, combine certain operations, temporally overlap certain operations, etc.

In various embodiments, the methods of FIGS. 6-8 may be performed by a processor, instruction processing apparatus, digital logic device, or integrated circuit. In some embodiments, the methods may optionally be performed by and/or with the processor 300 of FIG. 3. The components, features, and specific optional details described herein for the processor 300, may also optionally apply to the methods. Alternatively, the methods may optionally be performed by and/or within a similar or different processor or apparatus. Moreover, the processor of 300 may optionally perform methods the same as, similar to, or different than, the methods of FIGS. 6-8.

Figure 9:
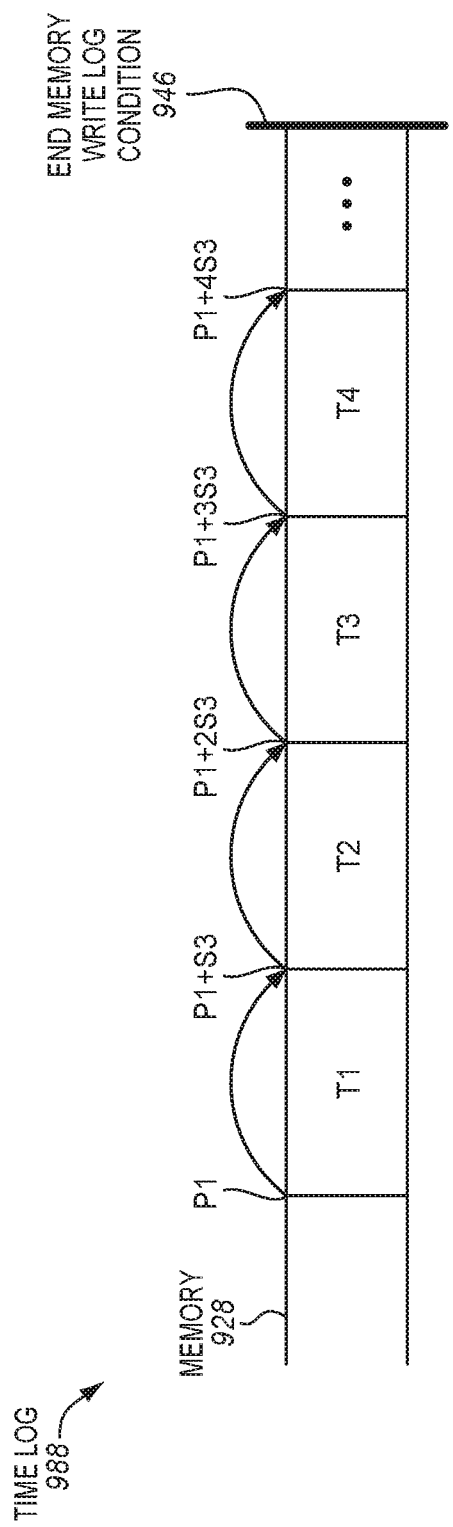
FIG. 9 is a block diagram of an example embodiment of a dedicated time log.

FIG. 9 is a block diagram of an example embodiment of a dedicated time log 988 that in some embodiments may be stored by an execution unit and/or a processor response to and/or due to an embodiment of a begin memory write log instruction. The time log may be stored in a memory 928. In the illustration, four times T1, T2, T3, and T4, and potentially more times, are stored until an end memory write log condition 946 occurs. Each of the times has a size in bits (S3). A pointer, offset, or other value may be updated by the size S3 each time a new time is stored to the time log.

Figure 10:
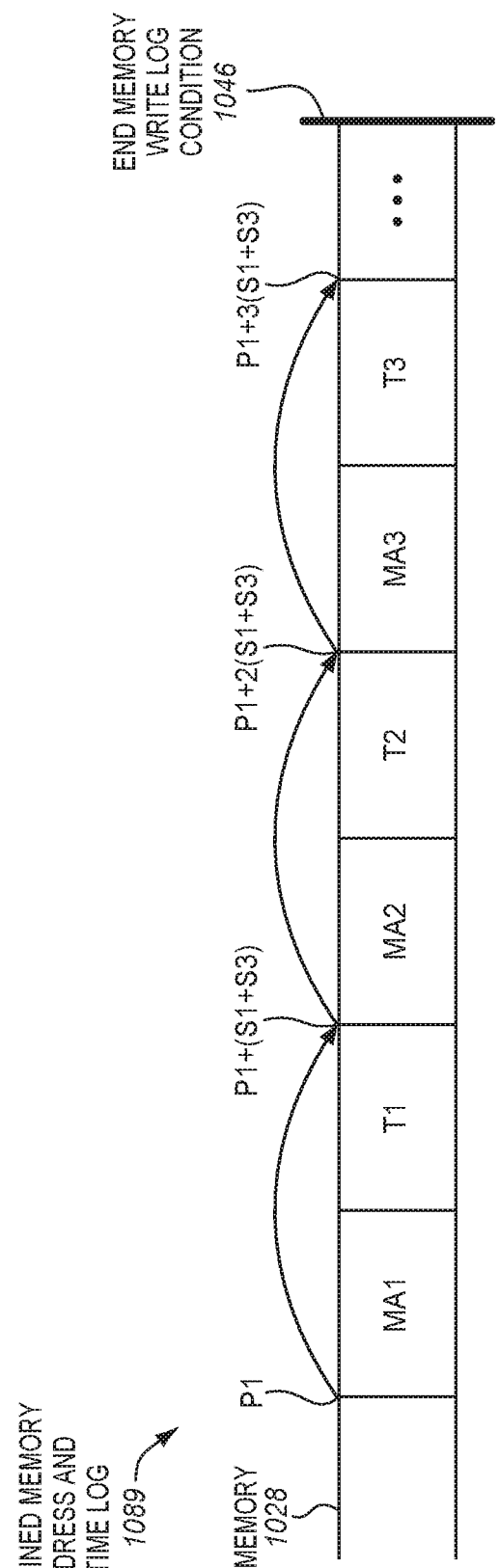
FIG. 10 is a block diagram of an example embodiment of a combined memory address and time log.

FIG. 10 is a block diagram of an example embodiment of a combined memory address and time log 1089 that in some embodiments may be stored by an execution unit and/or a processor in response to and/or due to an embodiment of a begin memory write log instruction. The combined memory address and time log may be stored in a memory 1028. In the illustration, three pairs of corresponding memory addresses and times MA1 and T1, MA2 and T2, MA3 and T3, and potentially more, are stored before an occurrence of an end memory write log condition 1046. A pointer, offset, or other value may be updated by the combined size of a memory address (S1) and size of the time (S3), each time a new pair is stored to the log.

Specific examples of logs and information stored therein has been shown and described above, although the scope of the invention is not so limited. In other embodiments, other types of information may optionally be stored in one or more logs in addition to and/or instead of the information described above. For example, an instruction pointer value for the write, memory address context information and/or memory address metadata, or other data associated with the writes, may optionally be stored. Examples such memory address context or metadata include, but are not limited to, page directory base information associated with the write, a process context identifier associated with the write (e.g., a hardware thread identifier of the hardware thread that performed the write), logical (e.g., virtual) to physical address translation information associated with the write, and the like. Such information may either be combined in a same log with the other types of information disclosed herein, or stored into separate dedicated log(s). Many various are contemplated and will be apparent to those skilled in the art and having the benefit of the present disclosure.

Figure 11:
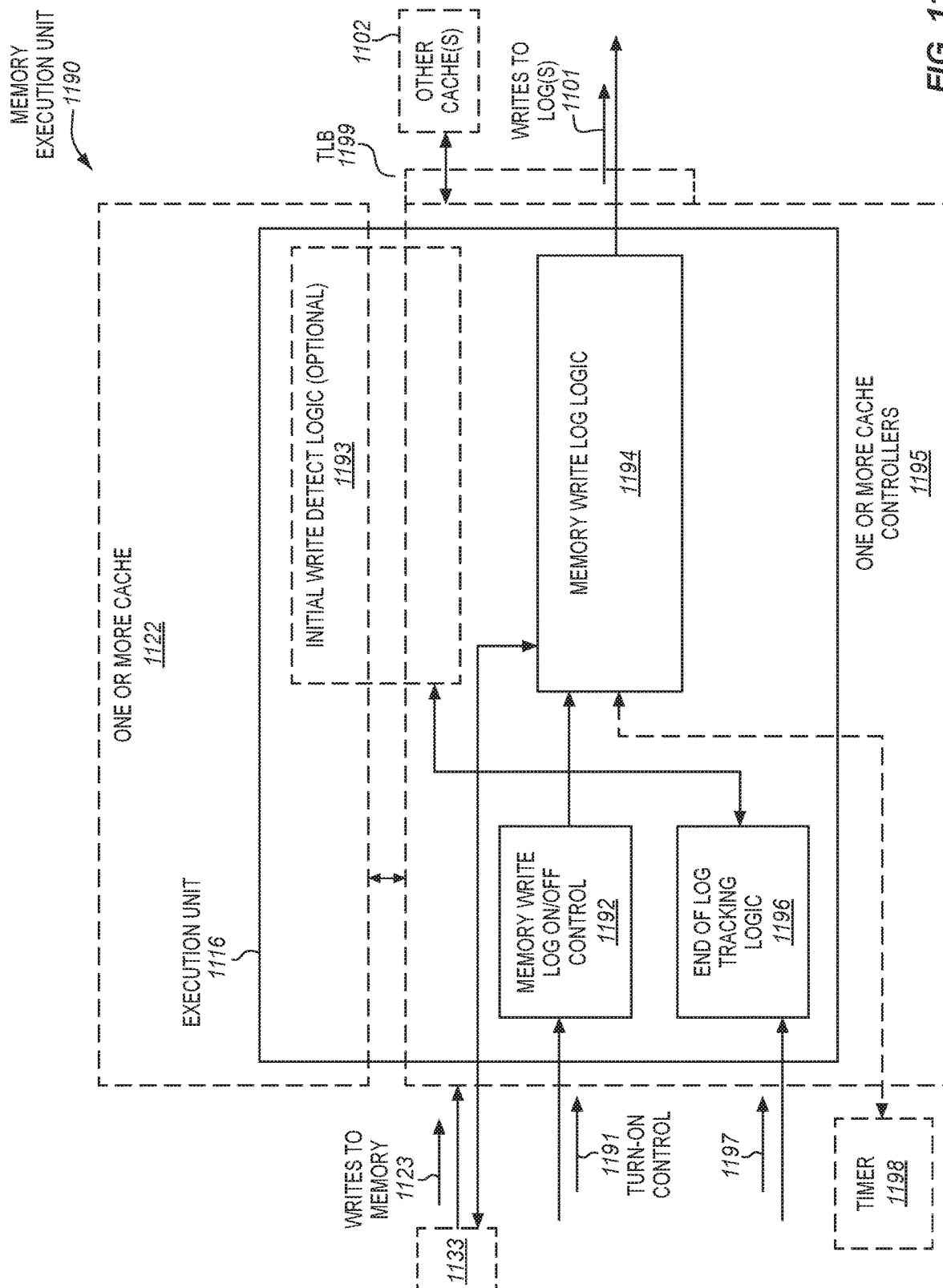
FIG. 11 is a block diagram of a detailed example embodiment of an execution unit to execute or perform an embodiment of a begin memory write log instruction.

FIG. 11 is a block diagram of a detailed example embodiment of an execution unit 1116 to execute or perform an embodiment of a begin memory write log instruction. In some embodiments, the execution unit 1116 may optionally be used for the execution unit 316 of FIG. 3. The components, features, and specific optional details described for the execution unit 1116 may also optionally apply to the execution unit 316. Alternatively, the execution unit 316 may optionally include a similar or different execution unit than the execution unit 1116.

One or more cache 1122, and one or more corresponding cache controllers 1195, are shown. In various aspects, the one or more caches may include any single one, or any combination, of an L1 cache, an optional L2 cache, and an optional L3 cache. As shown, in some embodiments, the execution unit may be implemented fully within the one or more caches and the one or more corresponding cache controllers, although the scope of the invention is not so limited.

The execution unit includes a memory write log on/off control 1192 to turn memory write logging on and off. Examples of suitable memory write log on/off control include, but are not limited to, a bit (e.g., in a control or configuration register of the processor), an on/off switch or control for an execution unit, an on/off switch or control for a state machine, or other type of on/off control mechanism. The performance of the begin memory write log instruction may begin or turn-on the memory write logging. A turn-on control or signal 1191 may be transmitted or otherwise provided to the memory write log on/off control when the begin memory write log instruction is being performed. For example, a microinstruction, micro-op, or other decoded instruction or control signal, may turn-on the memory write log on/off control after the instruction is decoded. Once turned on, the memory write log on/off control may signal or otherwise control other components of the execution unit to be on and/or activated so that the memory write logging continues until an occurrence of a memory write logging end condition.

As shown, the execution unit may optionally include initial write detection logic 1193. During the memory write logging period, writes to memory 1123 specifying memory addresses may be directed to the one or more cache controllers to check whether the corresponding data items are stored in the one or more caches. In some embodiments, the initial write detection logic may be operative to determine whether these writes are initial writes or subsequent writes. As shown, in some embodiments, the initial write detection logic may be partly distributed between the one or more caches and the one or more cache controllers. Alternatively, the initial write detection logic may optionally be omitted if logging is to be performed for all the writes (e.g., both initial and subsequent).

Referring again to FIG. 11, the execution unit also includes memory write log logic 1194. The memory write log logic may be operative to store information associated with at least all the initial writes to one or more logs. As shown, the memory write log logic may transmit or otherwise provide writes 1101 with such information to the one or more logs. Any one or more or any combination of the previously described types of information (e.g., memory addresses, data items, times, memory addressing context or metadata, or other information or data associated with the writes) may optionally be stored. If times are stored, the memory write log logic may be coupled with a timer 1198 of the processor (e.g., a time stamp counter, a performance monitor counter, a cycle accurate clock, etc.), to receive the times. The timer is not part of the execution unit but rather the execution unit is able to obtain the times from the timer. In some embodiments where virtual memory is used, the writes to the logs may pass through at least one translation lookaside-buffer (TLB) 1199. The TLB may perform virtual or logical memory address to physical memory address translation. If the log(s) cross a page boundary, the translations may be used to obtain the physical addresses to continue to expand the logs with additional writes or stores.

As shown, the execution unit may also include end of log tracking logic 1196. The end of log tracking logic may be coupled to receive one or more starting pointers, offsets, or other values 1197 provided by or derived from at least one destination memory address information indicated by the begin memory write log instruction. The end of log tracking logic may be operative to update the one or more values to account for information stored to one or more logs to keep track of the running end(s) of the one or more logs. This may be done substantially as previously described. There may be a same number of such values as the number of logs. The memory write log logic 1194 is coupled with the end of log tracking logic to receive the current values indicative of the end of the one or more logs where additional information is to be stored. The memory write log logic may perform the writes to the log(s) 1101 using the most current values.

The execution unit as well as any of its components thereof may be implemented in hardware (e.g., integrated circuitry, transistors, etc.), firmware (e.g., ROM, EPROM, flash memory, or other persistent or non-volatile memory and microcode, microinstructions, or other lower-level instructions stored therein), or a combination thereof. In the illustrated embodiment, the memory write log on/off control 1192, the optional initial write detect logic 1193, the memory write log logic 1194, and the end of log tracking logic 1196 of the execution unit are contained within the one or more caches 1122 and the one or more corresponding cache controllers 1195. Even if some of the logic of these components is distributed and/or is not physically contained within the one or more caches and the one or more cache controllers in an implementation, these components are accessible to and/or used by the one or more caches and the one or more cache controllers and may logically represent an additional part or extension of the one or more caches and the one or more cache controllers to allow them to perform the instruction. In such embodiments, it may be said that the one or more caches and the one or more cache controllers include and/or represent the execution unit to execute or perform the being memory write log instruction and/or that the one or more caches and the one or more cache controllers are able to execute or perform the being memory write log instruction and/or to perform the operations thereof. Typically, the logic of the execution unit, as well as the one or more caches and corresponding cache controllers is also contained within a memory execution unit 1190 and/or a memory subsystem of the processor. In such embodiments, it may be said that memory execution unit and/or the memory subsystem include and/or represent the execution unit to execute or perform the being memory write log instruction and/or that the one or more caches and the one or more cache controllers are able to execute or perform the being memory write log instruction and/or to perform the operations thereof.

Figure 12:
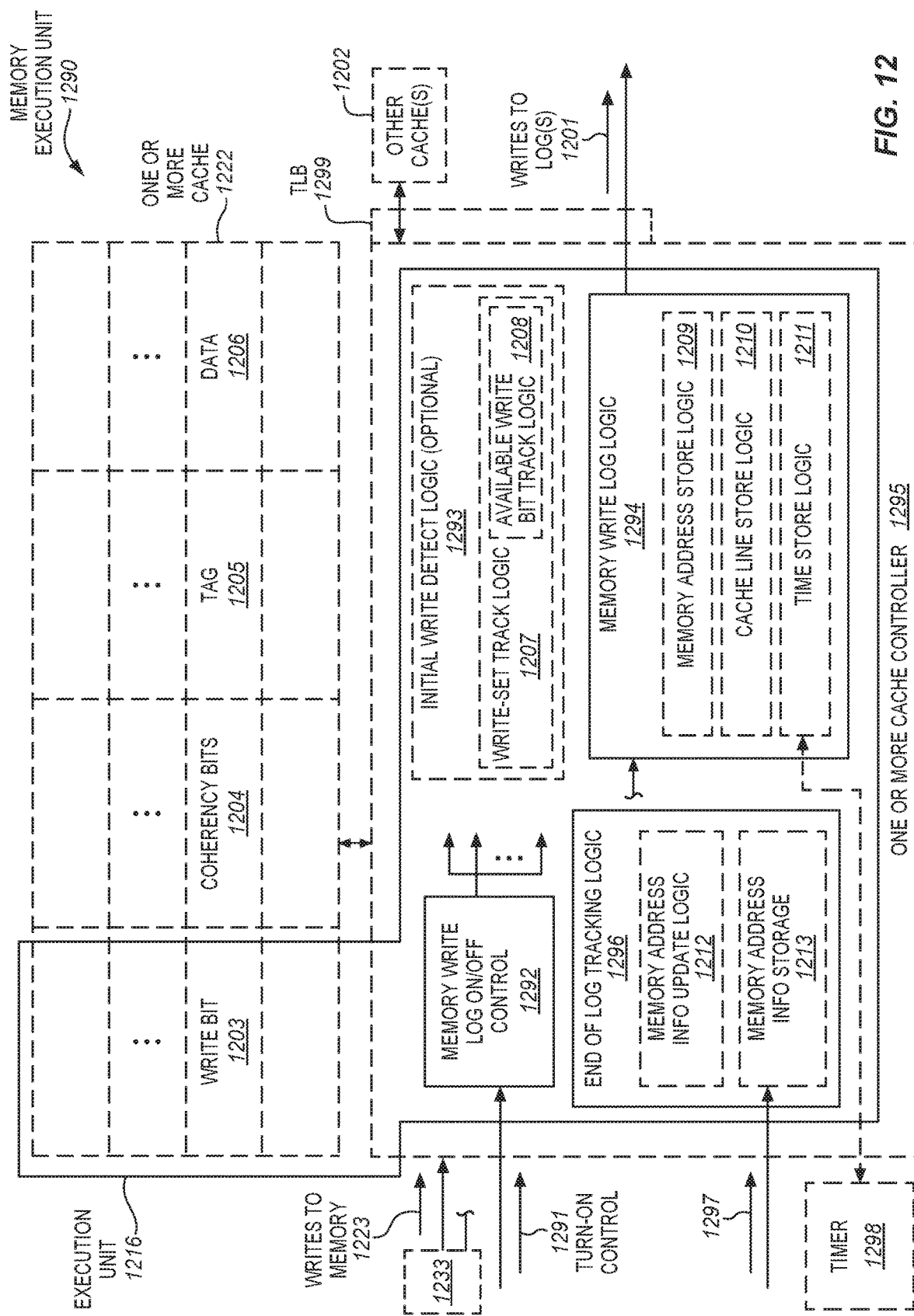
FIG. 12 is a block diagram of a more detailed example embodiment of an execution unit to execute or perform an embodiment of a begin memory write log instruction.

FIG. 12 is a block diagram of a more detailed example embodiment of an execution unit 1216 to execute or perform an embodiment of a begin memory write log instruction. In some embodiments, the execution unit 1216 may optionally be used for the execution unit 316 of FIG. 3. The components, features, and specific optional details described for the execution unit 1216 may also optionally apply to the execution unit 316. Alternatively, the execution unit 316 may optionally include a similar or different execution unit than the execution unit 1216.

Shown is a memory execution unit 1290, an execution unit 1216, one or more caches 1222, one or more corresponding cache controllers 1295, one or more optional other caches 1202, a TLB 1299, and a timer 1298. The execution unit includes memory write log on/off control 1292 which may receive a turn-on control 1291, optional initial write detection logic 1293 to check whether writes to memory 1223 are initial or subsequent writes, a memory write log logic 1294 to perform writes 1201 to one or more logs, and end of log tracking logic 1296 that may initially receive one or more starting values 1297. Unless otherwise specified, or otherwise clearly apparent, each of these components may optionally be similar to or the same as the correspondingly named components previously described for FIG. 11. To avoid obscuring the description, the different and/or additional characteristics of the embodiment of FIG. 12 will primarily be described, without repeating all the details already described which may optionally be the same or similar.

In some embodiments, the cache(s) may optionally be used to store cache lines (e.g., organized as sets and ways which for simplicity are not shown). As shown, in some embodiments, each of the cache lines may have a corresponding write bit 1203. Each of the cache lines generally also has a plurality of coherency bits 1204, a tag 1205, and data 1206. The coherency bits, the tag, and the data represent conventional fields. The coherency bits may correspond to an implemented cache coherency protocol. Examples of suitable protocols include, but are not limited to, MESI, MOSI, and MOESI. The MESI protocol includes four states, namely modified (M), exclusive (E), shared (S), and invalid (I), which are indicated by two MESI cache coherency protocol bits. The MOSI protocol utilizes the owned (O) state in place of the exclusive (E) state, and two bits are used to indicate the states. The MOESI protocol utilizes both the exclusive (E) and owned (O) states. The tags contain memory address information used to locate the cache line corresponding to an access to a memory address. The data represents the actual cache line or data item.

The execution unit includes optional initial write detect logic 1293 which optionally includes write-set track logic 1207. In some embodiments, the write bits 1203 may be used to indicate if the corresponding cache line has been written to within the memory write logging period of the begin memory write log instruction. In some embodiments, the initial write detection logic 1293 and/or the write-set track logic 1207 may be operative to configure (e.g., set and clear) the write bits. Initially, when starting to perform a begin memory write log instruction, the write-set track logic may configure all the write bits to a first value (e.g., cleared to binary zero) that is indicative of no writes having been performed. Then, when writes are made to cache lines, or a portion thereof, the write-set track logic may configure the corresponding write bits to a second different value (e.g., set to binary one) that is indicative that a write has been performed. Each write to memory that causes a write bit to transition from the first value to the second value may represent an initial write. These may be detected by the initial write detection logic and/or the write-set track logic as initial writes. Upon a second or subsequent write to the same cache line, the write-set track logic and/or the initial write detection logic may detect that the corresponding write bit already has the second value, and may determine that these are subsequent writes. At the end of the memory write logging period, the write-set track logic may optionally configure all the writes bits to have the first value, although this is not required. Although write bits are used in this embodiment, in other embodiments, the coherency bits 1204 (e.g., whether they indicate a modified or other dirty state) may instead optionally be used to detect initial writes and/or for write-set tracking by the write-set track logic. In still other embodiments, the initial write detect logic may optionally include one or more bloom filters to track the initial writes and/or the write-set. In some embodiments, to use the write bits and/or the cache coherency protocol bits for tracking, the cache controller(s) may retain the caches in the cache hierarchy (e.g., prevent their eviction all the way to system memory) during the memory write logging period.

In some embodiments, the initial write detection logic 1293 and/or the write-set track logic 1207 may optionally include available write bit tracking logic 1208. The available write bit tracking logic represents a specific example of additional resource tracking logic. The available write bit tracking logic may determine whether there are any additional write bits that have not already been set to the second value and/or if there are any additional cache lines that have not yet been written to within the memory write logging period of the begin memory write logging instruction. As one example, the available write bit track logic may include logical AND logic to logically AND all the write bits, or logical OR logic to logically OR all the write bits, and make a determination from the result. This may broadly represent a determination whether hardware capabilities to continue to implement the instruction have been exhausted. For example, if all available write bits have already been set to indicate a corresponding initial write (e.g., detected by the logical AND returning a value of one), then a write bit may not be available to record or indicate another initial write when it is performed. This may represent a lack of resources to further track or monitor all initial writes and/or to continue to perform memory write logging for the begin memory write log instruction. In some embodiments, this may represent a memory write log end condition. In such a case, in some embodiments, the available write bit tracking logic may provide a turn off signal or control to the memory write log on/off control to turn the memory write logging off. In some embodiments, the initial write detection logic and/or the execution unit may store a value in an architectural visible storage location (e.g., a bit in an architectural register) to indicate that the begin memory write log instruction was stopped due to lack of resources.

In some embodiments, the initial write detection logic 1293 and/or the write-set track logic 1207 may optionally leverage or reuse at least some logic that is also used for hardware transactional execution. Hardware transactional execution is also sometimes referred to as hardware transactional memory. Transactional execution broadly represents a synchronization technique that includes executing a set of instructions atomically as a transaction. A transaction, which may also be referred to as execution of a critical or atomic section/region of code, includes a grouping of instructions or operations to be executed as an atomic group. For example, instructions or operations may be used to demarcate or delimit a transaction or a critical section. Typically, during execution of a transaction, updates to memory are not made globally visible until the transaction is committed. As an example, a transactional write to a location is potentially visible to a local thread, but in response to a read from another thread the write data is not forwarded until the transaction including the transactional write is committed. While the transaction is still pending, data loaded from and written to within a memory are tracked. Once the transaction reaches a commit point, if conflicts have not been detected for the transaction, then the transaction is committed and updates made during the transaction are made globally visible atomically. However, if the transaction is invalidated during its pendency, the transaction is aborted and potentially restarted without making the updates globally visible. In contrast to transactional execution, typically writes to memory are not made transactional by the begin memory write log instruction, but rather are allowed to proceed unconditionally and non-transactional all the way to memory without needing to be transactionally committed. In hardware transactional memory, hardware or logic of the processor (e.g., on die), as opposed to purely software, is included to support access tracking, conflict resolution, and potentially other transactional tasks. One example implementation of hardware transactional execution is Intel® Transactional Synchronization Extensions (Intel® TSX). Further details of Intel® TSX, if desired, are available in Intel® 64 and IA-32 Architectures Software Developer's Manual, Vols. 1-3, published July 2017, by Intel Corporation (see e.g., Chapter 16), and in Intel® 64 and IA-32 Architectures Optimization Reference Manual, Order Number: 248966-030, published September 2014, by Intel Corporation (see e.g., Chapter 12).

Transactional execution often already includes the capability to create and track write-sets of transactions. For example, this may be performed by one or more transactional execution enabled caches and their cache controllers (e.g., an Intel® TSX capable cache or cache hierarchy), a transactional execution engine (e.g., an Intel® TSX engine), write-set tracking logic used for transactional execution, or the like. In some embodiments, the initial write detection logic and/or the write-set track logic may optionally leverage or reuse at least some of this logic or/or capability to create and track write-sets for transactional execution (e.g., write-set tracking logic). For example, write-set track logic used for transactional execution may optionally be reused for the initial write detect logic and/or the write-set track logic, although this is not required. Advantageously, if the processor also supports transactional execution, then leveraging or reusing at least some of such logic and/or capabilities may help to reduce the amount of additional logic or that needs to be added to implement the begin memory write logic instruction, which in turn may help to avoid an increase to the die area and/or power consumption. Alternatively, in other embodiments, such as if the processor does not support transactional execution, the initial write detection logic and/or the write-set track logic may optionally include at least some logic or capability similar to, but likely simpler than, such transactional execution logic (e.g., omitting the conflict detection and transactional commit/abort mechanisms of transactional execution).

Referring again to FIG. 12, in some embodiments, the memory write log logic 1294 may optionally include memory address store logic 1209 to store memory addresses to a memory address log, although this is not required. Such logic may obtain the memory address of the corresponding write received at the cache controller(s), and use the memory address as the data for a corresponding store operation that is addressed to the running end of the memory address log, which may be obtained or derived from information from the end of log tracking logic 1296. In some embodiments, cache coherency logic and/or snoop logic of the cache controller(s) may optionally be slightly modified and leveraged or reused to assist with performing these stores or writes for the memory addresses which are stored all the way to the memory address log.

In some embodiments, the memory write log logic 1294 may optionally include cache line store logic 1210 to store cache lines to a data item log, although this is not required. Such logic may obtain the initial/original cache line contents (e.g., the data 1206) implicated by the write received at the one or more cache controllers (or alternatively the modified data to be stored in the cache line) and store it with a store operation to the memory address representing the running end of the data item log, which may be obtained or derived from information from the end of log tracking logic 1296. In some embodiments, cache line eviction logic of the cache controller(s) may optionally be slightly modified and leveraged or reused to assist with performing these stores or writes for cache lines that are not evicted but retained in the cache but an initial copy of the cache lines is to be stored to the data item log.

In some embodiments, the memory write log logic 1294 may optionally include time store logic 1211 to store times of the memory writes to a time log, although this is not required. Such logic may obtain times from the timer 1298 when the corresponding write is received at the cache controller(s) (e.g., within one or maybe two clock cycles thereof), and store it with a store operation to the memory address representing the running end of the time log, which may be obtained or derived from information from the end of log tracking logic 1296. If two or more of the logics 1209, 1210, 1211 are implemented commonly much of the store operation generation logic may be reused or shared among them with mainly different data payloads being used for the stores.

Referring again to FIG. 12, in some embodiments, the end of log tracking logic 1296 may optionally include memory address information storage 1213 to store one or more memory address information (e.g., memory addresses, portions of memory addresses, pointers, offsets, or other values from which memory addresses can be generated). Examples of suitable storage includes, but is not limited to, one or more temporary registers, random access memory (RAM) such as static RAM (SRAM), flash memory, or other types of storage used for processor registers, processor caches, or the like. In some embodiments, memory address information update logic 1212 may update the memory address information as information is stored to one or more logs based on the size of the information stored. This may be performed substantially as previously described. Examples of suitable memory address information update logic includes, but is not limited to, one or more adders, one or more incrementors, and the like. The on/off state from the memory write log on/off control and the current value(s) from the end of log tracking logic may optionally represent architectural state and/or state that is saved and restored on context switches so that in an operating system environment where thread preemption happens progress can be suspended and resumed.

It is to be appreciated that the execution units of FIGS. 11-12 are merely examples and that other different execution units may optionally be used instead. Moreover, in some cases where multiple components have been shown and described, where appropriate they may instead optionally be integrated together as a single component. In other cases, where a single component has been shown and described, where appropriate it may optionally be separated into two or more components. Other execution units may also optionally omit certain components and add additional components. Other distributions of the components throughout the memory execution unit and/or the memory subsystem of a processor are also possible.

Figure 13:
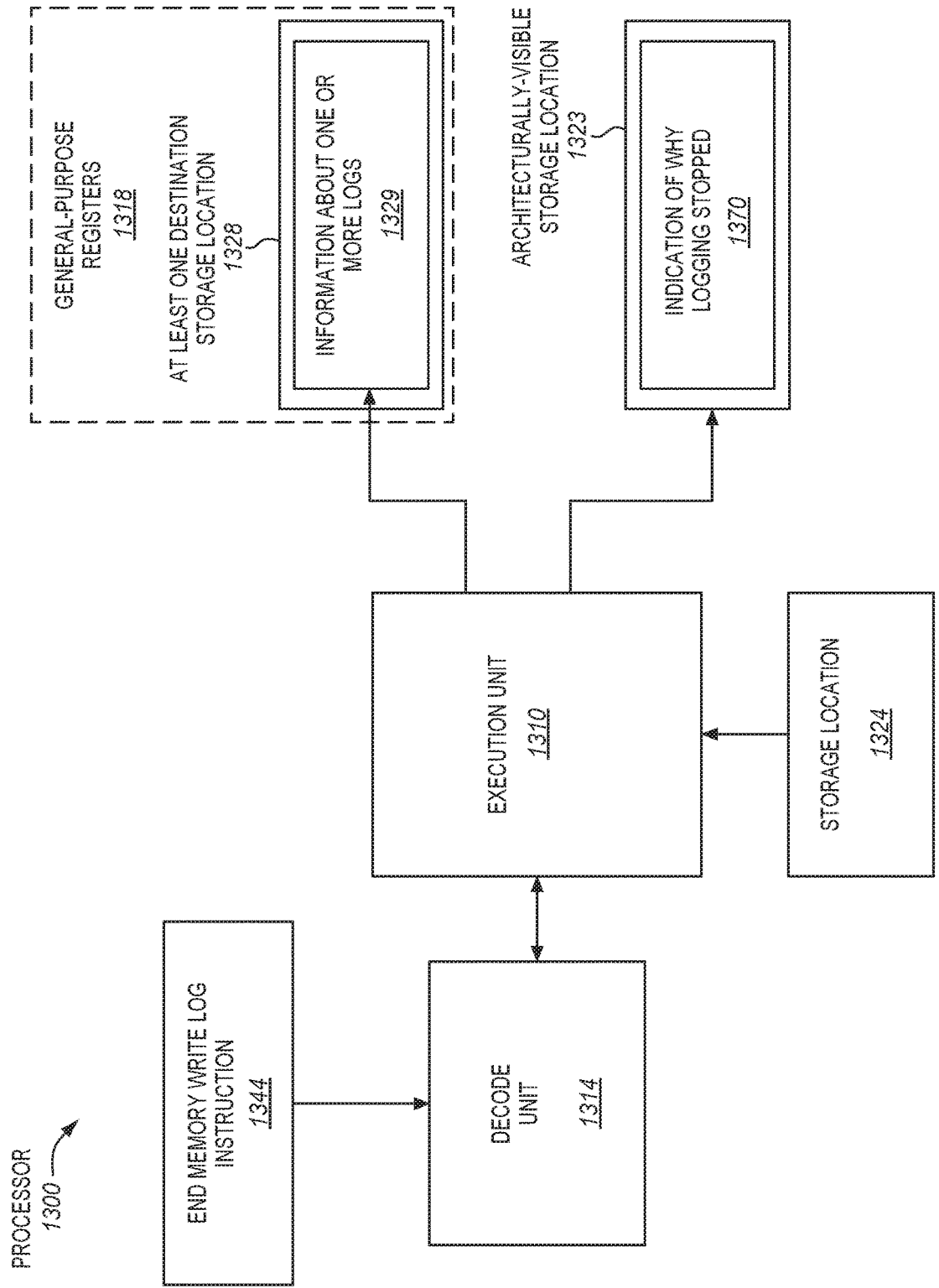
FIG. 13 is a block diagram of an embodiment of a processor that is operative to perform an embodiment of an end memory write log instruction.

FIG. 13 is a block diagram of an embodiment of a processor 1300 that is operative to perform an embodiment of an end memory write log instruction 1344. Aside from the aspects pertaining to the end memory write log instruction instead of the begin memory write log instruction, the processor 1300 may optionally be similar to, or the same as, the processor 300 of FIG. 3. For clarity, there is no requirement that the processor 1300 is operable to perform the begin memory write log instruction, although it may commonly have this capability. To avoid obscuring the description, the different and/or additional characteristics of the processor 1300 will primarily be described, without repeating all the characteristics which may optionally be the same as, or similar to, those described for the processor 300.

The processor 1300 includes a decode unit 1314 that is operative to decode the end memory write log instruction. The decode unit may be similar to, or the same as, the previously described decode unit 314. In some embodiments, a single decode unit may be included to decode both the begin and end memory write log instructions, although this is not required. The end memory write log instruction may explicitly specify (e.g., through one or more fields or a set of bits) or otherwise indicate (e.g., implicitly indicate) at least one destination storage location 1328, or in some cases optionally multiple destination storage locations. In various embodiments, the at least one destination storage location may optionally be in one or more registers of the processor (e.g., one or more of a set of general-purpose registers 1318), optionally in one or more destination memory locations in main or primary memory, or other suitable storage locations, or a combination thereof. The general-purpose registers 1318 may be the same as or similar to the general-purpose registers 318.

An execution unit 1310 is coupled with the decode unit 1314 to receive one or more decoded or otherwise converted instructions or control signals that represent and/or are derived from the end memory write log instruction. The execution unit may also be coupled with the at least one destination storage location. For example, the execution unit may be coupled with the general-purpose registers 1318 if a destination storage location is one of the general-purpose registers. The execution unit may also be coupled with at least one storage location 1328 (e.g., a temporary register or other microarchitectural storage location).

The execution unit and/or the processor may be operative in response to and/or due to the end memory write log instruction (e.g., in response to the one or more instructions or control signals decoded from the instruction and/or in response to the instruction being decoded and/or in response to the instruction being provided to a decoder) to cause the processor to stop memory write logging (e.g., due to performance of an earlier begin memory write log instruction), and to store information 1329 about one or more logs in the at least one destination storage location 1328. For example, if the memory write logging includes storing a first type of information (e.g., memory addresses) to a first log (e.g., a memory address log) then such storing of the first type of information to the first log may be stopped, and information about the first log may be stored in a destination storage location. As another example, if the memory write logging includes storing a first type of information (e.g., memory addresses) to a first log (e.g., a memory address log) and storing a second type of information (e.g., data items) to a second log (e.g., a data item log) then such storing of the first type of information to the first log and storing the second type of information to the second log may be stopped, and information about the first log may be stored in a first destination storage location, and information about the second log may be stored in a second destination storage location.

In some embodiments, the information 1329 about one or more logs may include information that is indicative of an end or extent or size of the one or more logs. For example, the information may be indicative of a last memory location stored to during the memory write logging. Suitable examples of such information include, but are not limited to, a memory pointer to point to the last memory location, a memory address of the last memory location, an offset from a start of the log (e.g., as measured from destination memory address information provided by an earlier begin memory write log instruction), the final pointer, offset, or other values updated during the performance of the begin memory write log instruction as discussed elsewhere herein, or the like. In some embodiments, such information may be obtained or derived from information stored in at least one storage location 1324 (e.g., which may be used to store one or more values indicative of one or more running ends of one or more logs). Suitable examples of the storage location 1324 include, but are not limited to, the storage locations 452, 453 and/or the storage 1213.

In some embodiments, the execution unit and/or the processor, in response to and/or due to the begin memory write log instruction, may optionally store an indication 1370 of why the logging stopped in an architecturally-visible storage location 1323. Examples of suitable architecturally-visible storage locations include, but are not limited to, an architecturally-visible register of the processor (e.g., a general-purpose register, a flags, status, or condition code register that is used to store a plurality of flags, status bits, or condition code bits) and a memory location in main memory. As one example, the architecturally-visible storage location (e.g., a flag) may be configured to a first value (e.g., set to binary one) to indicate that logging was stopped due to performance of the end memory write log instruction instead of to a second value (e.g., cleared to binary zero) to indicate that logging was stopped due to another reason (e.g., due to lack of resources). In other embodiments, the operations of the end memory write log instruction may optionally be incorporated into the begin memory write log instruction (e.g., it may perform such operations when it is terminated due to one or more different reasons besides an end memory write log instruction.

As described above, in some embodiments, the execution unit or processor, in response to the begin memory write log instruction, may track or keep a record of which cache lines or other data items were updated and/or written to during the memory write logging period. For example, write bits, modified cache coherency bits, or some other write set tracking mechanism or logic may be used for this. In some embodiments, a processor or an execution unit may use this information, at the time of ending the memory write logging, to perform additional operations for each of the data items updated or written to during the memory write logging period. In some embodiments, this may be done by the execution unit of the begin memory write log instruction as part of ending memory write logging. In other embodiments, this may be done by the execution unit of the end memory write log instruction.

As one example, in some use cases, it may not be useful or important to keep such updated or written to data items in the lower-level caches, or even in the cache hierarchy. In such cases, the execution unit may cycle through the data items written to and perform an operation to deprioritize each of these data items for caching. This may include encouraging or accelerating eviction of the data items from a lower-level cache to a higher-level cache, encouraging or accelerating eviction of the data items from a cache hierarchy to system memory, or causing or forcing the eviction of the data items from the cache hierarchy to system memory. This may be done in various ways, such as, for example, by forcing an eviction, influencing a cache line eviction algorithm or process (e.g., changing least recently used bits so a cache line appears less recently used). In another example, the execution unit may cycle through the data items written to and perform an operation to write back the cache line or other data item to system memory while retaining the data item in the cache hierarchy in a non-modified state (e.g., by changing the cache coherency state). This may be performed for all the data items as part of performing the either one of the begin and end memory write log instructions instead of by a different instruction for each data item.

The begin and end memory write log instructions disclosed herein are general-purpose instructions that have general usefulness, and that may be used for various purposes. Those skilled in the art will devise various ways to use the instructions and/or the one or more logs. The scope of the invention is not limited to any known use. However, to further illustrate certain concepts, a few contemplated uses will be briefly described.

One example area in which these instructions and/or the one or more logs may be very useful is assisting with data backup and/or checkpointing. As one example, they may help to accelerate applications that need to use otherwise expensive read-copy-update (RCU) patterns. RCU is a pattern that may be employed when a data structure needs to be changed in several places, and it tends to be inefficient to find, make-a-backup copy, and replace individual items in the data structure one at a time. The instructions and/or logs disclosed herein help to make RCU simpler to maintain. Instead of making a copy, it is possible to proceed with the original data structure, and simply record the parts that are changed (e.g., log memory addresses) and what they were before the change (e.g., the initial data items), so that at the end, you can just append the difference relative to the original somewhere if you care. If not, you can simply undue of the changes by copying back from the initial data items. In other words, the read and copy parts of the RCU may be taken care of substantially transparently such that the RCE mainly includes the update portion.

As another example, they may help to simplifying non-volatile memory (NVM) checkpointing. Often it is sufficient for an application to write data asynchronously into NVM, but maintain a checkpoint of what changes are being made, so that in the event of a corruption, interruption, or failure of an operation, the changes may be undone and the data from an earlier checkpoint may be reinserted in place. Keeping track of such changes in software tends to be tedious, and may tend to be unreliable (e.g., if the software module doing the tracking is stopped, fails, or encounters some other hiccup). However, checkpoints can be rolled forward easily by applying the differences preserved in the log(s) by the instructions disclosed herein. For example, for NVM it is possible to keep writing asynchronously in the foreground, logging updates from original values in the background into log(s) representing a difference store (e.g., on a low performance storage device), and to restore from the checkpoint of the log(s) that is the latest that can be constructed based on these two.

Another example area in which these instructions and/or the one or more logs may be very useful is assisting with debugging. In such uses, the one or more logs may be useful as event logs in debugging that are useful to help analyze and understand the operation of programs and diagnose problems. For example, they may help to extend debugging capabilities to better investigate otherwise complex issues that may occur in programs that use cooperative multithreading (e.g., manage shared state from several threads concurrently). A common issue with such programs that employ such cooperative multithreading is the occurrence of data races when the programs do not employ proper mechanisms to protect access to shared data. Detecting unexpected changes of shared state may tend to be a time-consuming task to integrate proper tracing in software to try to identify root cause. Such tracing in software may also not be reliable, since it may be intrusive by nature and may perturb timings in such a way that the problem may disappear when tracing is used. However, the logs disclosed herein may potentially help to improve data race detection and/or debugging. Tracking performed in hardware generally tends to have a much lower overhead, and tends to be more reliable compared to software approaches which might miss the change of the state in the cache. Accordingly, the logs may make it easier to detect and debug data race conditions.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
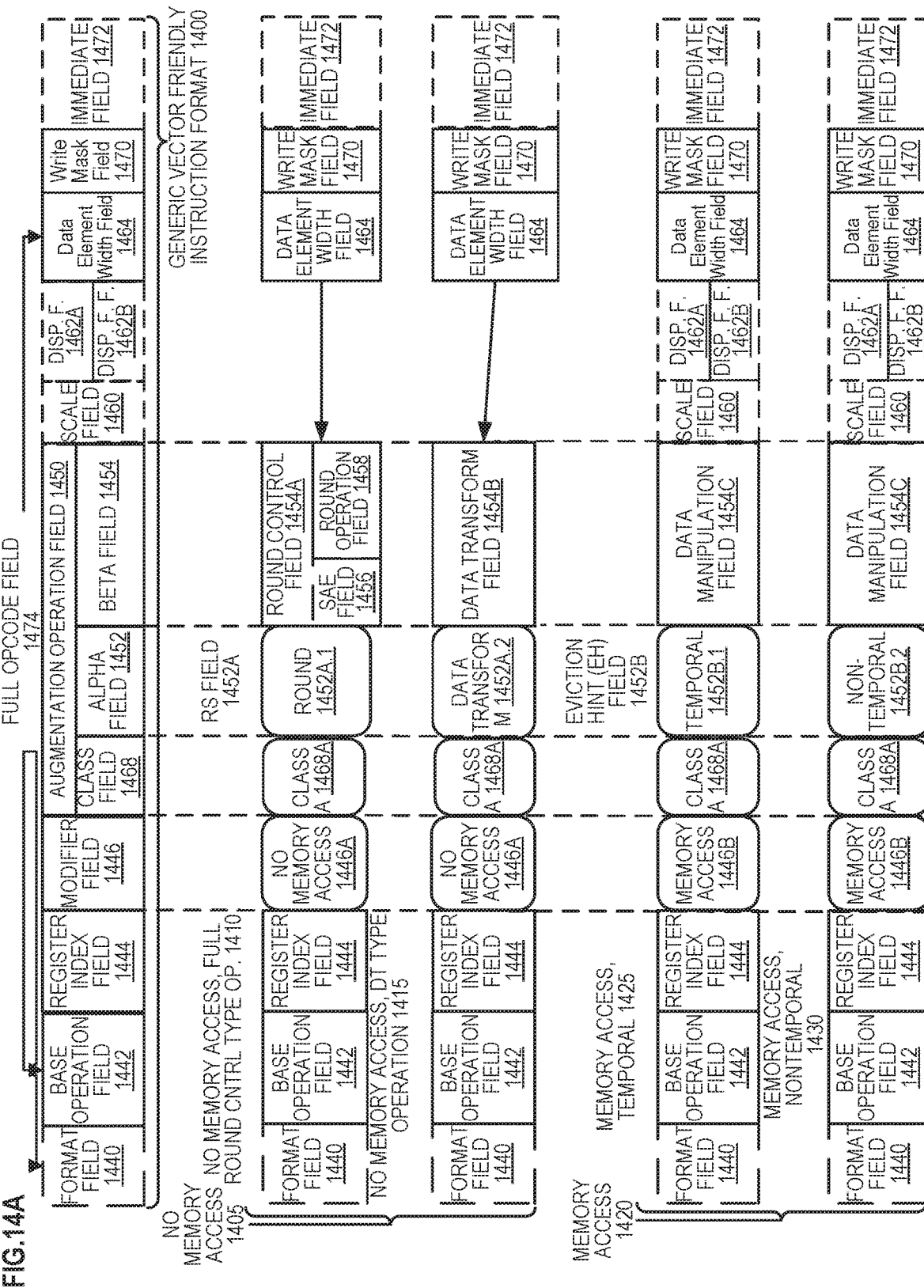
FIGS. 14A-14B are block diagrams illustrating a generic vector friendly instruction format and instruction templates thereof according to embodiments of the invention.
Figure 14B:
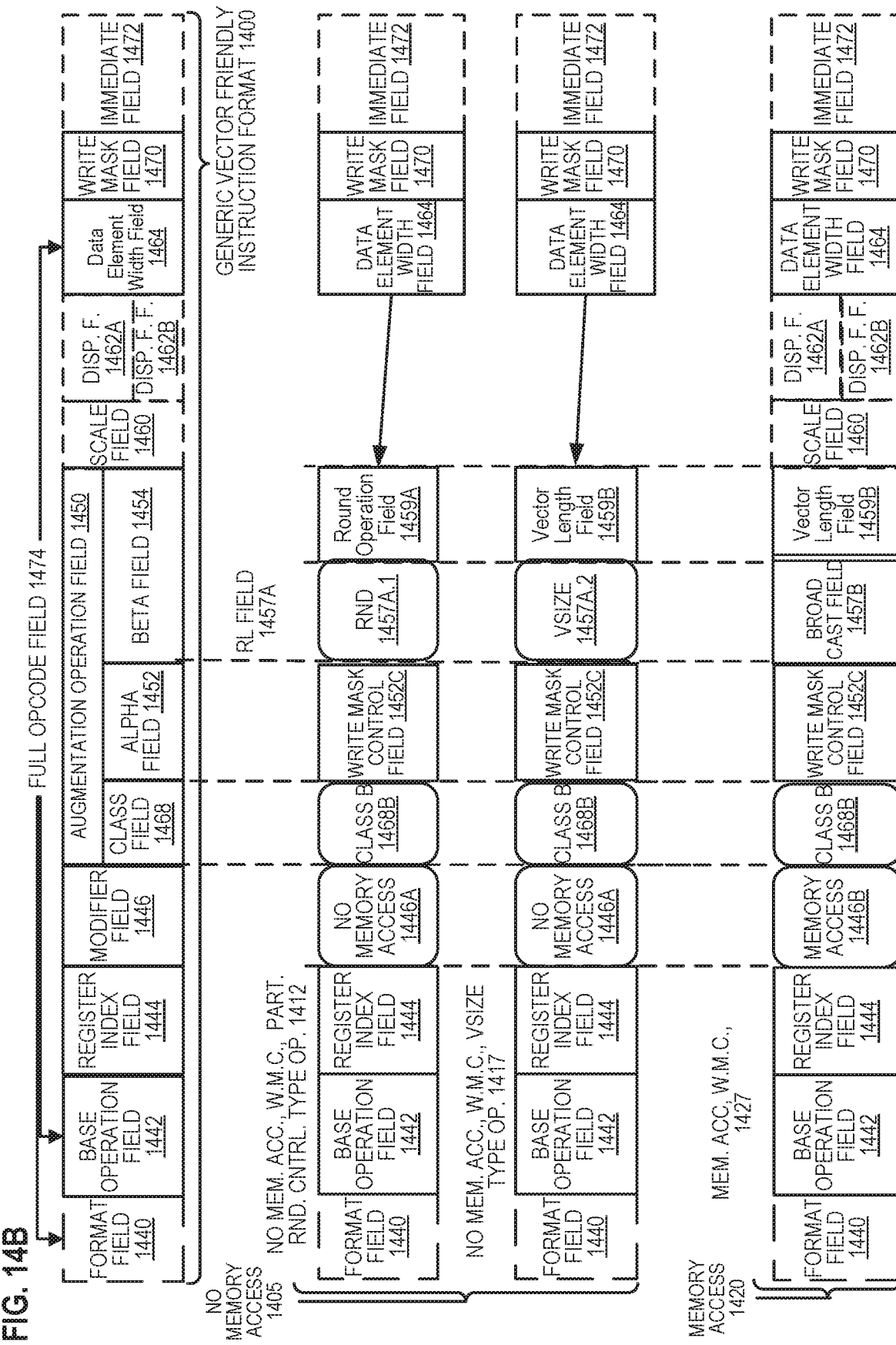

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the invention, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*\text{index}+\text{base}$).

Displacement Field 1462A—its content is used as part of memory address generation (e.g., for address generation that uses $2^{scale}*\text{index}+\text{base}+\text{displacement}$).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the invention are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the invention the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the invention where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the invention where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15A is a block diagram illustrating an exemplary specific vector friendly instruction format according to embodiments of the invention. FIG. 15A shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15A map are illustrated.

It should be understood that, although embodiments of the invention are described with reference to the specific vector friendly instruction format 1500 in the context of the generic vector friendly instruction format 1400 for illustrative purposes, the invention is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the invention is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the invention).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]—R), EVEX.X bit field (EVEX byte 1, bit [6]—X), and 1457BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]—mmmm)—its content encodes an implied leading opcode byte (0F, 0F 38, or 0F 3).

Data element width field 1464 (EVEX byte 2, bit [7]—W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1s complement) form. Depending on the instruction, an extra different EVEX bit field is used to extend the specifier size to 32 registers.

EVEX.U 1468 Class field (EVEX byte 2, bit [2]—U)—If EVEX.U=0, it indicates class A or EVEX.U0; if EVEX.U=1, it indicates class B or EVEX.U1.

Prefix encoding field 1525 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1472 operates as previously described.

Full Opcode Field

FIG. 15B is a block diagram illustrating the fields of the specific vector friendly instruction format 1500 that make up the full opcode field 1474 according to one embodiment of the invention. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the invention. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
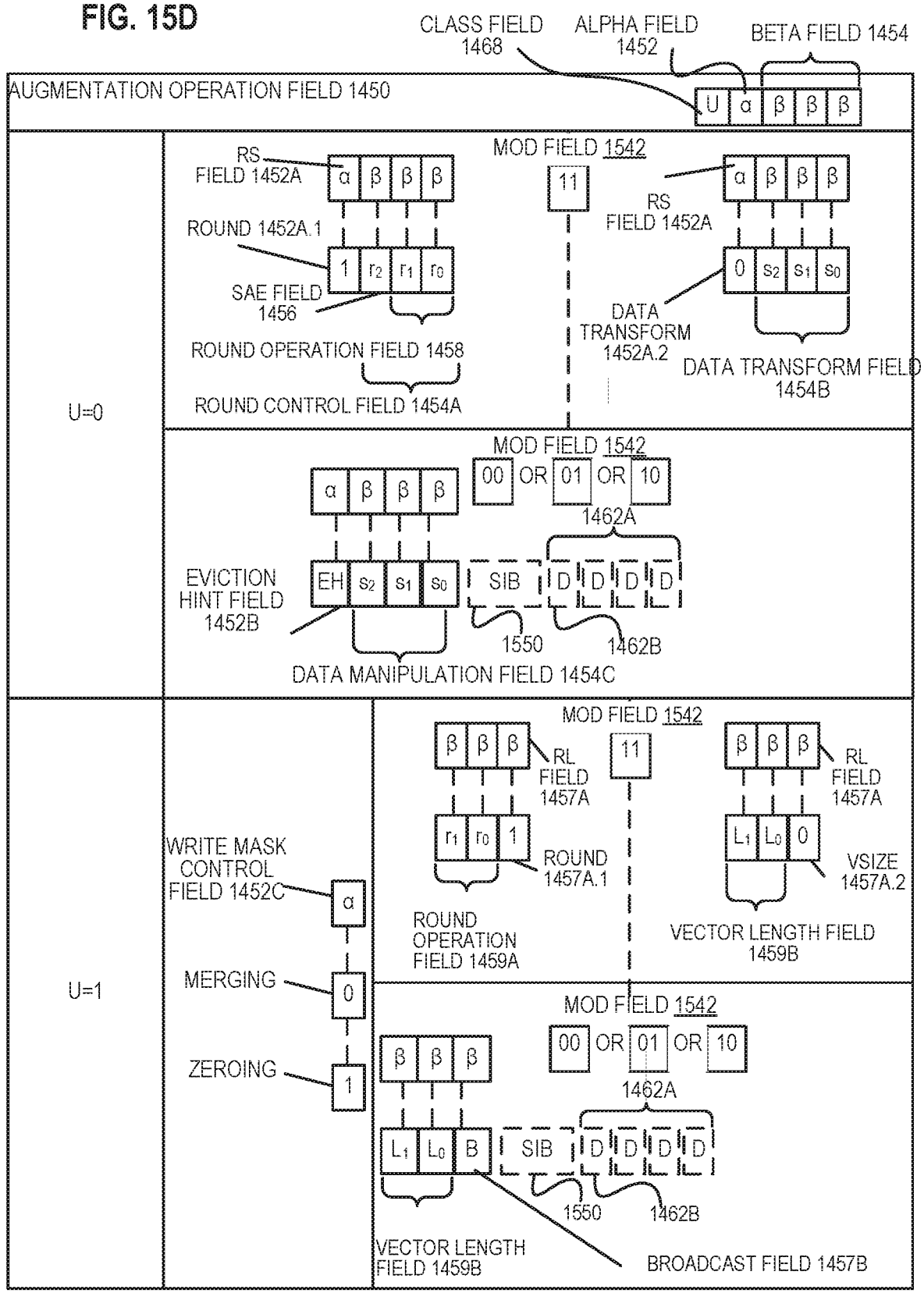
FIG. 15D is a block diagram illustrating the fields of the specific vector friendly instruction format that make up the augmentation operation field according to one embodiment of the invention.

FIG. 15D is a block diagram illustrating the fields of the specific vector friendly instruction format 1500 that make up the augmentation operation field 1450 according to one embodiment of the invention. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]—EH) is interpreted as the rs field 1452A. When the rs field 1452A contains a 1 (round 1452A.1), the beta field 1454 (EVEX byte 3, bits [6:4]—SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]—SSS) is interpreted as a three bit data transform field 1454B. When U=0 and the MOD field 1542 contains 00, 01, or 10 (signifying a memory access operation), the alpha field 1452 (EVEX byte 3, bit [7]—EH) is interpreted as the eviction hint (EH) field 1452B and the beta field 1454 (EVEX byte 3, bits [6:4]—SSS) is interpreted as a three bit data manipulation field 1454C.

When U=1, the alpha field 1452 (EVEX byte 3, bit [7]—EH) is interpreted as the write mask control (Z) field 1452C. When U=1 and the MOD field 1542 contains 11 (signifying a no memory access operation), part of the beta field 1454 (EVEX byte 3, bit [4]—$S_0$) is interpreted as the RL field 1457A; when it contains a 1 (round 1457A.1) the rest of the beta field 1454 (EVEX byte 3, bit [6-5]—$S_{2-1}$) is interpreted as the round operation field 1459A, while when the RL field 1457A contains a 0 (VSIZE 1457.A2) the rest of the beta field 1454 (EVEX byte 3, bit [6-5]—$S_{2-1}$) is interpreted as the vector length field 1459B (EVEX byte 3, bit [6-5]—$L_{1-0}$). When U=1 and the MOD field 1542 contains 00, 01, or 10 (signifying a memory access operation), the beta field 1454 (EVEX byte 3, bits [6:4]—SSS) is interpreted as the vector length field 1459B (EVEX byte 3, bit [6-5]—$L_{1-0}$) and the broadcast field 1457B (EVEX byte 3, bit [4]—B).

Exemplary Register Architecture

Figure 16:
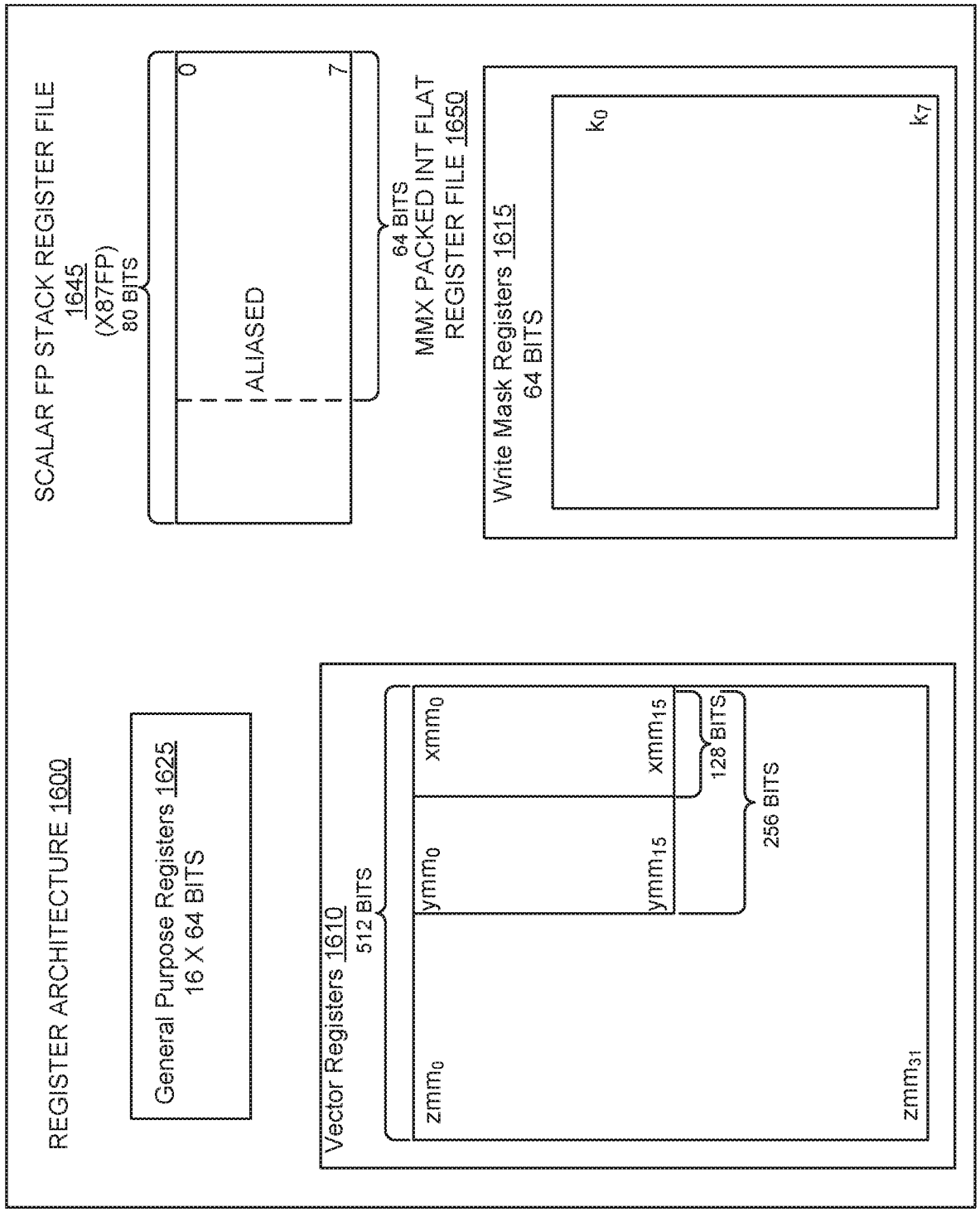
FIG. 16 is a block diagram of a register architecture according to one embodiment of the invention.

FIG. 16 is a block diagram of a register architecture 1600 according to one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Figure 19:
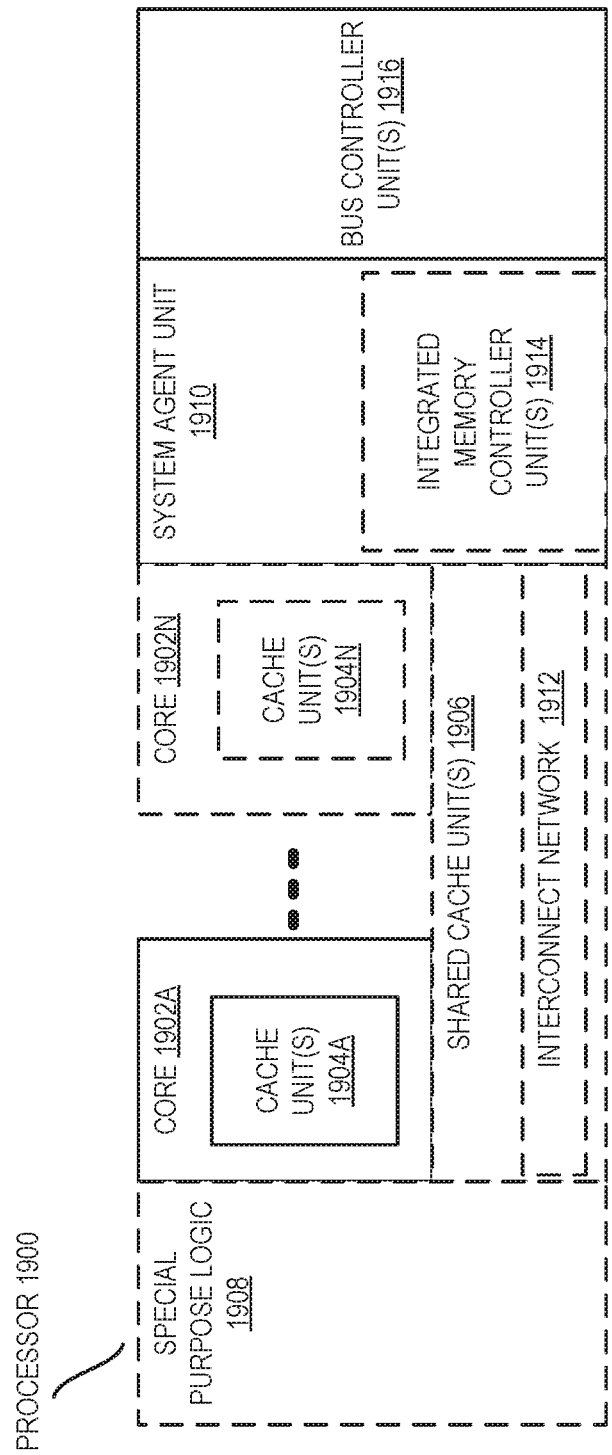
FIG. 19 is a block diagram of a processor that may have more than one core, may have an integrated memory controller, and may have integrated graphics according to embodiments of the invention.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908 (integrated graphics logic 1908 is an example of and is also referred to herein as special purpose logic), the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
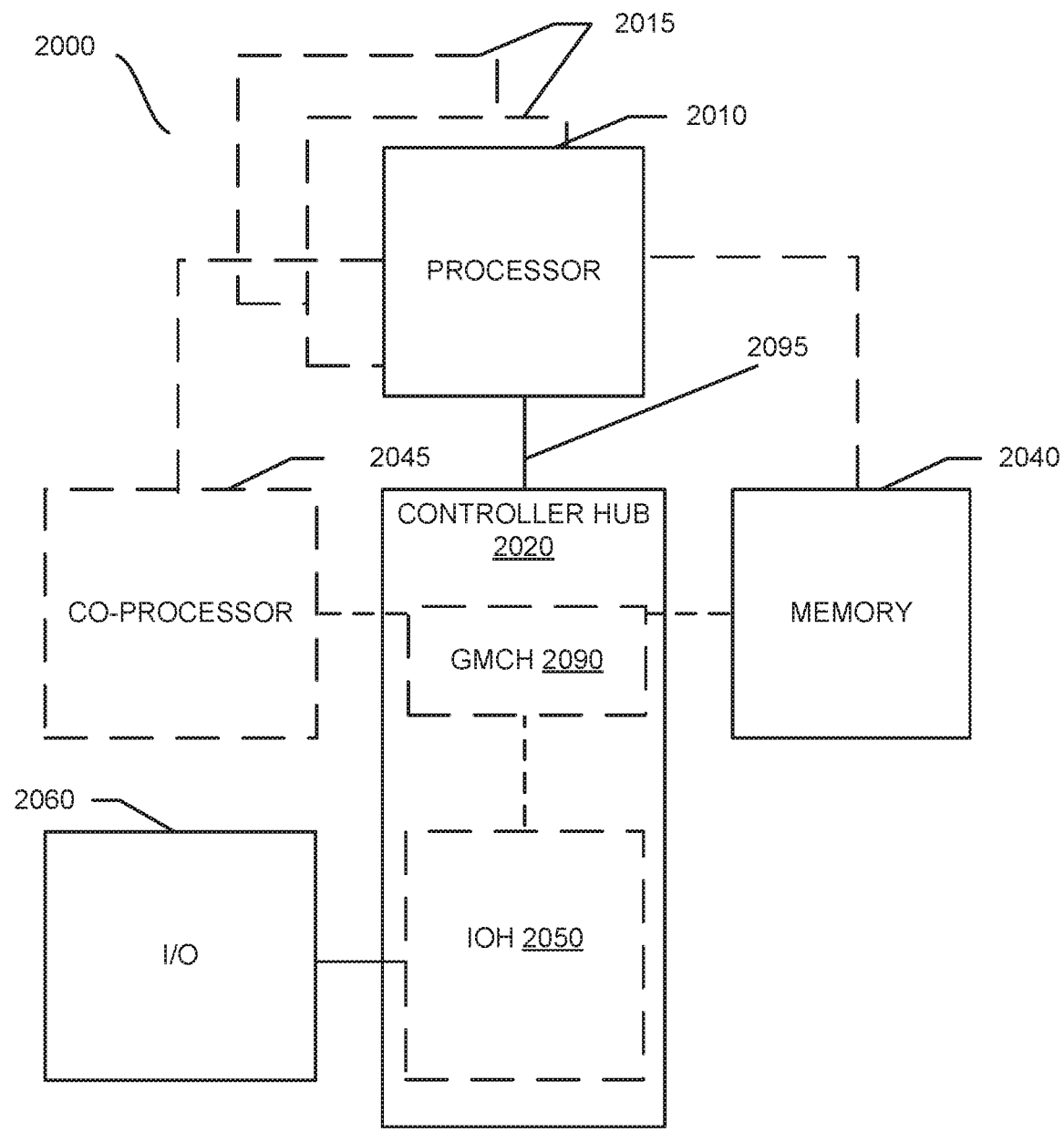
FIG. 20 shown a block diagram of a system in accordance with one embodiment of the present invention.

Referring now to FIG. 20, shown is a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
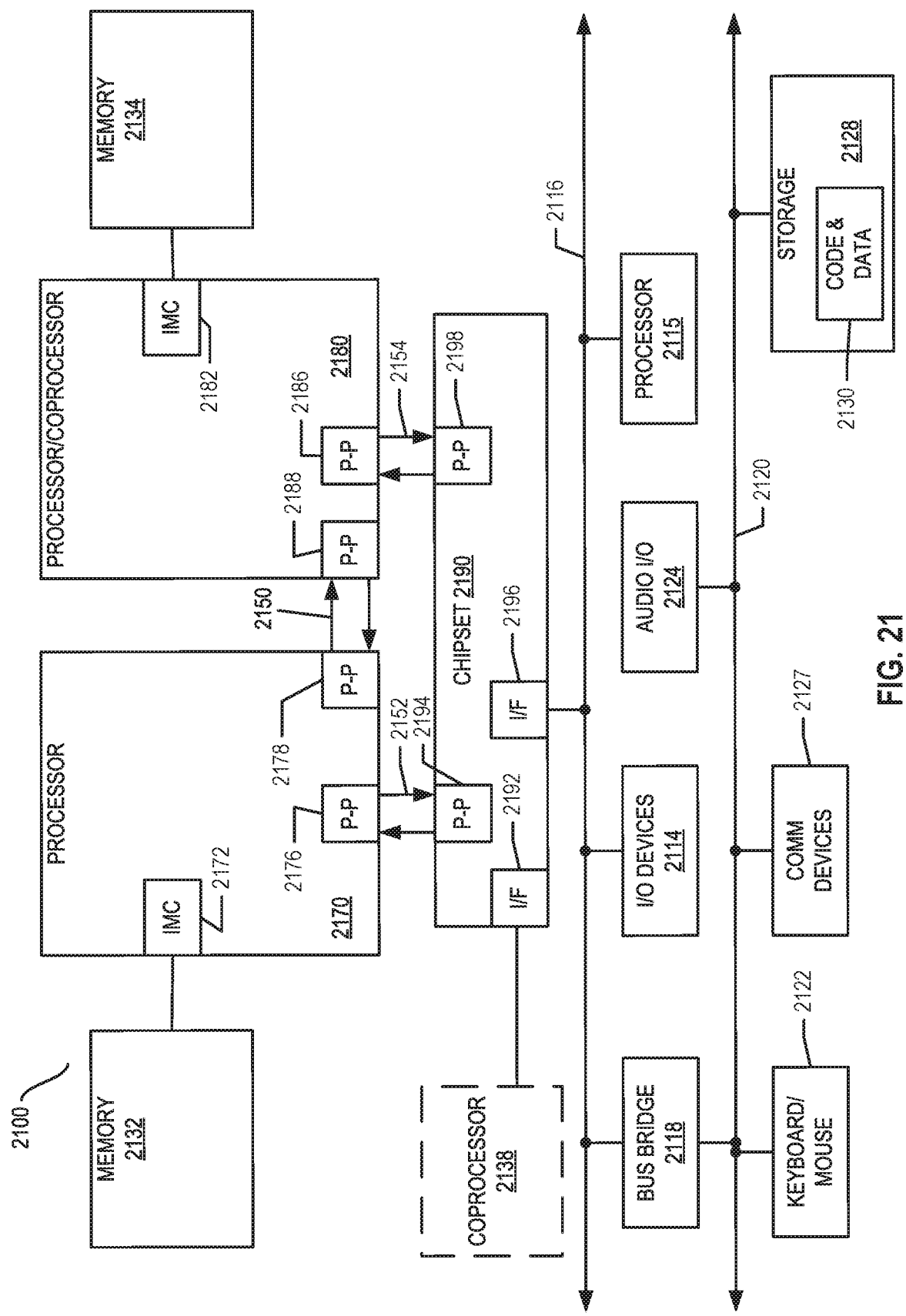
FIG. 21 is a block diagram of a first more specific exemplary system in accordance with an embodiment of the present invention.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2192. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
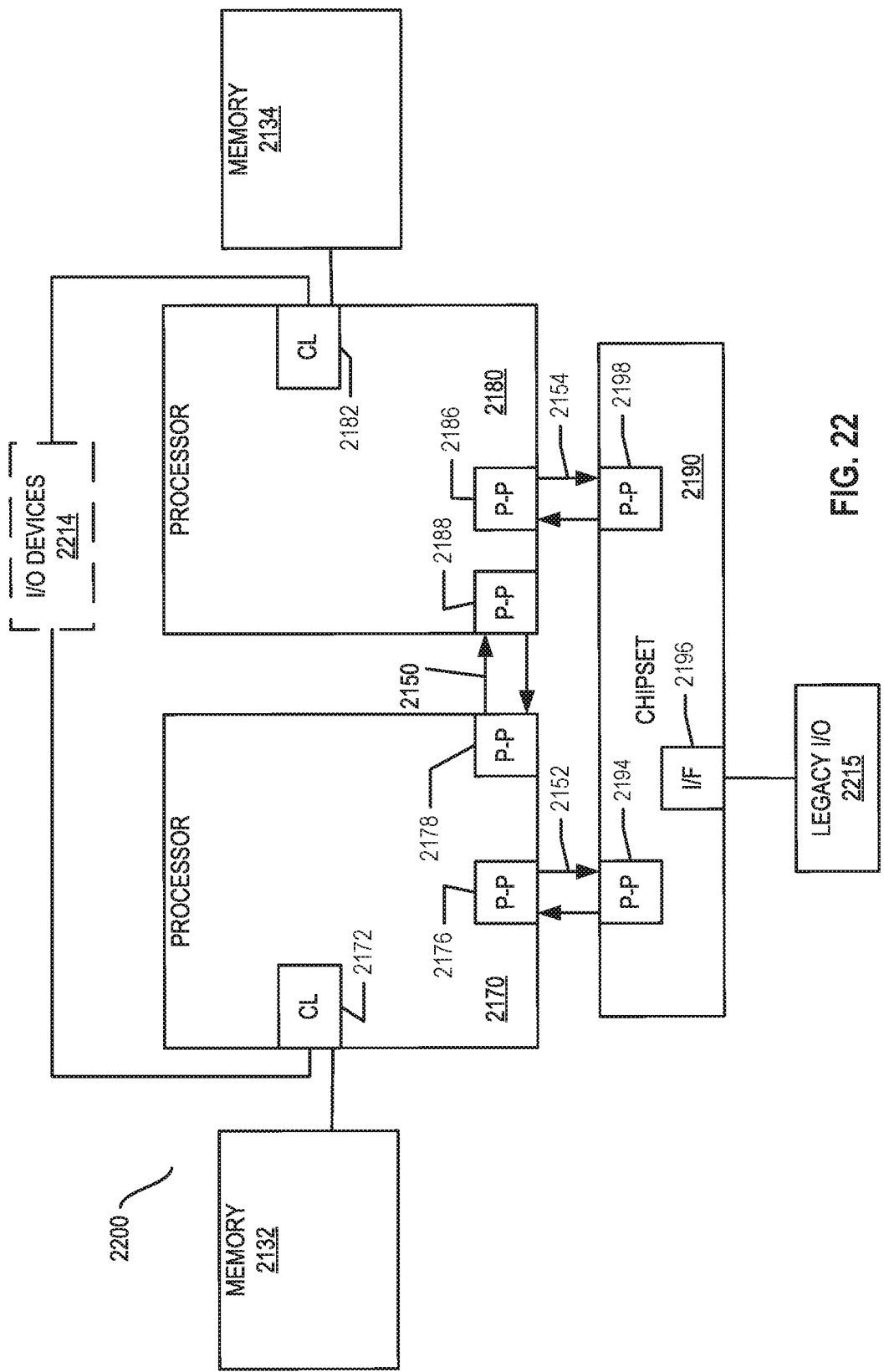
FIG. 22 is a block diagram of a second more specific exemplary system in accordance with an embodiment of the present invention.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
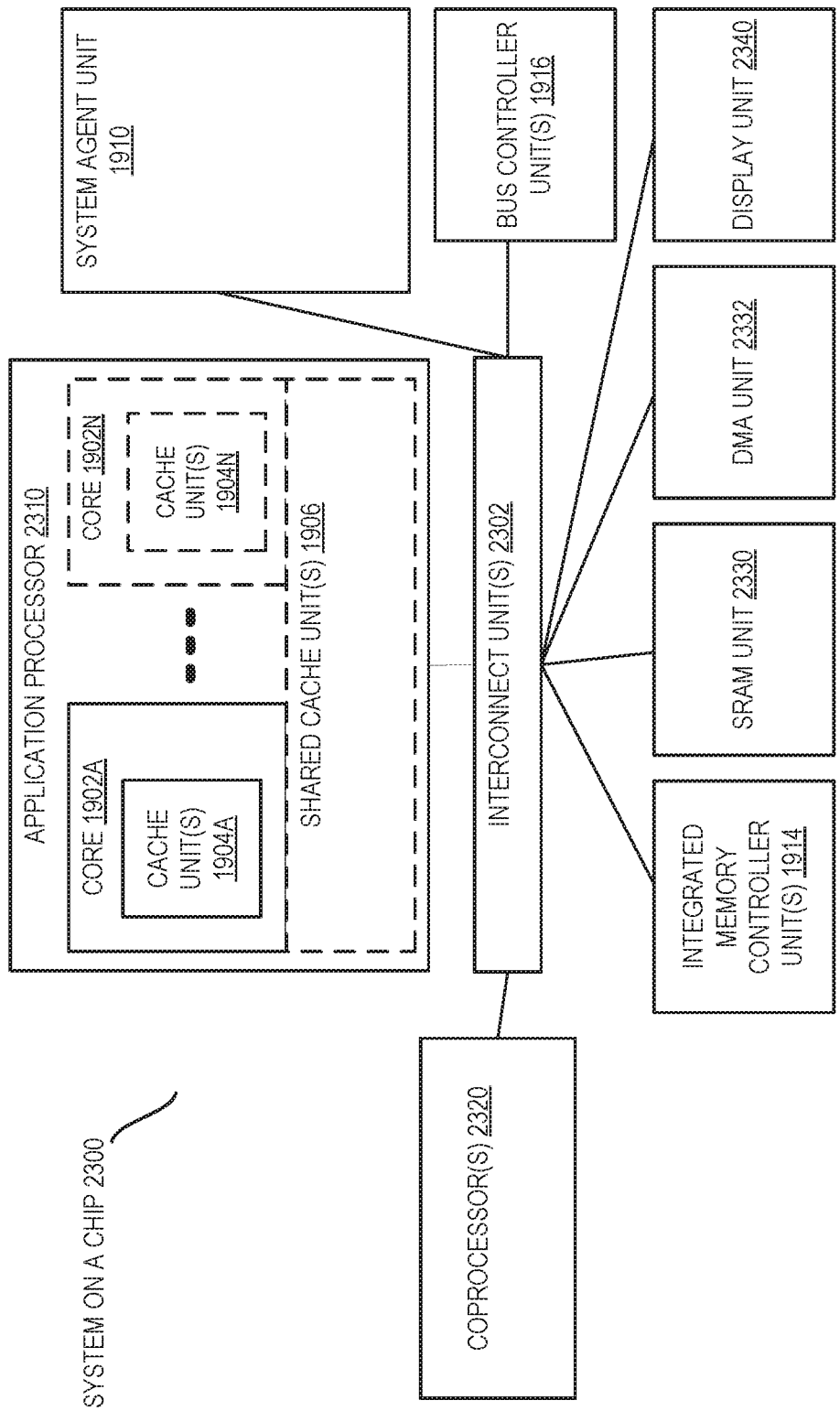
FIG. 23 is a block diagram of a SoC in accordance with an embodiment of the present invention.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 1902A-N, which include cache units 1904A-N, and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

Features, and details described for any of FIGS. 4-7 and 9-12 may also optionally apply to any of FIGS. 2, 3, and 8. The processors disclosed herein (e.g., processor 300) may optionally perform the methods disclosed herein (e.g., 206, 884). Any of the processors described herein (e.g., processor 300) in embodiments may optionally be included in any of the systems disclosed herein (e.g., any of the systems of FIGS. 20-23).

Processor components disclosed herein may be said and/or claimed to be operative, operable, capable, able, configured adapted, or otherwise to perform an operation. For example, a decoder may be said and/or claimed to decode an instruction, an execution unit may be said and/or claimed to store a log or result, or the like. As used herein, these expressions refer to the characteristics, properties, or attributes of the components when in a powered-off state, and do not imply that the components or the device or apparatus in which they are included is currently powered on or operating. For clarity, it is to be understood that the processors and apparatus as claimed herein are not powered on or running.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail to avoid obscuring the understanding of the description. In many cases, reference numerals, or terminal portions thereof, have been repeated among the figures to indicate corresponding or analogous elements, which may optionally have similar or the same characteristics, unless clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides (e.g., stores) information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, servers, network devices (e.g., routers and switches.), Mobile Internet devices (MIDs), media players, smart televisions, nettops, set-top boxes, video game consoles, and autonomous driving vehicles.

Reference throughout this specification to "one embodiment," "an embodiment," "one or more embodiments," "some embodiments," for example, indicates that a particular feature may be included in the practice of embodiments of the invention but is not necessarily required to be. Similarly, in the description various features are sometimes grouped together in a single embodiment, Figure, or description thereof for purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode an instruction (e.g., a begin memory write log instruction). The instruction is to indicate a destination memory address information. The processor also includes an execution unit coupled with the decode unit. The execution unit, in response to the decode of the instruction, is to store memory addresses, for at least all initial writes to corresponding data items, which are to occur after the instruction in original program order, to a memory address log. The start of the memory address log is to correspond to the destination memory address information.

Example 2 includes the processor of Example 1, in which the execution unit, in response to the decode of the instruction, is optionally to store the memory addresses in a same order in position in the memory address log as an order that the associated aforementioned at least all initial writes occur over time.

Example 3 includes the processor of Example 2, in which the execution unit, in response to the decode of the instruction, is optionally to store the memory addresses in consecutive positions in the memory address log.

Example 4 includes the processor of Example 3, in which the execution unit, in response to the decode of the instruction, is optionally to update a value, to account for a size of a memory address, when each of the memory addresses is stored to the memory address log. The value is to be indicative of a memory location in the memory address log where a next memory address is to be stored.

Example 5 includes the processor of any one of Examples 1 to 4, in which the execution unit, in response to the decode of the instruction, is optionally to store the data items, for at least all of the initial writes, to a data item log. This data items stored may optionally be those before the data items are updated due to aforementioned at least all initial writes.

Example 6 includes the processor of Example 5, in which the decode unit is to decode the instruction that is optionally to indicate a second destination memory address information. The execution unit, in response to the decode of the instruction, may optionally store the data items to the data item log. A start of the data item log may optionally correspond to the second destination memory address information.

Example 7 includes the processor of Example 5, in which the execution unit, in response to the decode of the instruction, is optionally to store the memory addresses and store the data items to a combined memory address and data item log. A start of the combined memory address and data item log may optionally correspond to the destination memory address information. The corresponding memory addresses and data items may optionally be interleaved with one another in the combined memory address and data item log.

Example 8 includes the processor of any one of Examples 1 to 7, in which the execution unit, in response to the decode of the instruction, may optionally store times indicative of when aforementioned at least all initial writes are performed to a time log.

Example 9 includes the processor of any one of Examples 1 to 8, in which the execution unit, in response to the decode of the instruction, may optionally stop storing the memory addresses to the memory address log when an end memory write log condition occurs.

Example 10 includes the processor of Example 9, in which the execution unit, in response to the decode of the instruction, is optionally to detect the occurrence of the end memory write log condition as a lack of resources to further track aforementioned at least all initial writes. In some cases, the execution unit may also optionally store an indication in an architecturally-visible storage location that the lack of resources was detected.

Example 11 includes the processor of any one of Examples 1 to 9, in which the decode unit is also to decode a second instruction (e.g., an end memory write log instruction) that is to indicate a destination storage location. The processor may optionally also include a second execution unit coupled with the decode unit. The second execution unit, in response to the decode of the second instruction, may optionally cause the processor to stop storing memory addresses to the memory address log due to performance of the instruction. Optionally, the second execution unit may store information indicative of a last memory location in the memory address log that was stored to, during the performance of the instruction. Such information may be stored to the indicated destination storage location.

Example 12 includes the processor of Example 11, in which the information indicative of the last memory location is optionally either a memory pointer to point to the last memory location or an offset from the destination memory location indicated by the instruction.

Example 13 includes the processor of any one of Examples 11 to 12, in which the second execution unit, in response to the decode of the second instruction, is optionally to store an indication in an architecturally-visible storage location that the storage of the memory addresses to the memory address log was stopped due to the second instruction.

Example 14 includes the processor of any one of Examples 1 to 13, in which the processor is optionally to transform the memory addresses, prior to the storage of the memory addresses to the memory address log. The memory addresses may variously be transformed through at least one of encryption, compression, and addition of redundancy data for the memory addresses.

Example 15 includes the processor of any one of Examples 1 to 14, in which the data items are optionally cache lines.

Example 16 includes the processor of any one of Examples 1 to 15, in which the execution unit, in response to the decode of the instruction, is optionally not to store memory addresses for subsequent writes to the data items, which occur after the initial writes to the data items, to the memory address log.

Example 17 includes the processor of any one of Examples 1 to 16, in which the execution unit optionally includes transactional execution write-set tracking logic to track data items written to while performing the instruction.

Example 18 is a method performed by a processor that includes receiving an instruction (e.g., a begin memory write log instruction) at the processor. The instruction indicates a destination memory address information. The method also includes storing memory addresses, in response to the instruction, for at least all initial writes to corresponding data items, which occur after the instruction in original program order, to a memory address log. The start of the memory address log corresponds to the destination memory address information.

Example 19 includes the method of Example 18, further including, in response to the instruction, optionally storing the data items, for at least all the initial writes. The data items that are stored may optionally be those before the data items are updated due to at least all initial writes, to a data item log.

Example 20 includes the method of any one of Examples 18 to 19, further optionally including, in response to the instruction storing times, which indicate when aforementioned at least all initial writes are performed, to a time log.

Example 21 includes the method of any one of Examples 18 to 20, further optionally including receiving a second instruction (e.g., an end memory write log instruction) at the processor. The second instruction optionally indicating a destination storage location. In response to the second instruction, causing the processor to stop storing memory addresses to the memory address log due to performance of the instruction. Optionally, information indicative of a last memory location in the memory address log that was stored to, during the performance of the instruction, may be stored in the optionally indicated destination storage location.

Example 22 is a system to process instructions including an interconnect and a processor coupled with the interconnect. The processor may receive an instruction (e.g., a begin memory write log instruction). The instruction may indicate a destination memory address information. The processor, in response to the instruction, may store memory addresses, for at least all initial writes to corresponding data items, which are to occur after the instruction in original program order, to a memory address log. The start of the memory address log may correspond to the destination memory address information. The system may also include a dynamic random-access memory (DRAM) coupled with the interconnect.

Example 23 includes the system of Example 22, in which the processor, in response to the instruction, is optionally to store the data items, for aforementioned at least all initial writes, before the data items are updated due to aforementioned at least all initial writes, to a data item log.

Example 24 is an article of manufacture including a non-transitory machine-readable storage medium. The non-transitory machine-readable storage medium stores a plurality of instructions including an instruction (e.g., a begin memory write log instruction). The instruction may indicate a destination memory address information. The instruction, if executed by a machine, is to cause the machine to perform operations including to store memory addresses, for at least all initial writes to corresponding data items, which occur after the instruction in original program order, to a memory address log. The start of the memory address log may correspond to the destination memory address information.

Example 25 includes the article of manufacture of Example 24, in which the instruction, if executed by the machine, is further to cause the machine to perform operations including optionally to store the data items, for aforementioned at least all initial writes, before the data items are updated due to aforementioned at least all initial writes, to a data item log.

Example 26 is a processor that includes a decode unit to decode an instruction, the instruction to indicate that is to indicate a destination storage location. The processor also includes an execution unit coupled with the decode unit. The execution unit, in response to the decode of the instruction, is to cause the processor to stop storing memory addresses to the memory address log due to performance of the instruction, and store information indicative of a last memory location in the memory address log that was stored to, during the performance of the instruction, to the indicated destination storage location.

Example 27 includes the example of claim 26, in which the information is optionally either a memory pointer to point to the last memory location or an offset from the destination memory location indicated by the instruction.

Example 28 includes the example of any one of Examples 26 to 27, in which the execution unit may also optionally store an indication in an architecturally-visible storage location that the storage of the memory addresses to the memory address log was stopped due to the second instruction.

Example 29 includes the processor of any one of Examples 1 to 17 and 26, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 30 includes a system-on-chip that includes at least one interconnect, the processor of any one of Examples 1 to 17 and 26 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 31 is a processor or other apparatus operative to perform the method of any one of Examples 18 to 21.

Example 32 is a processor or other apparatus that includes means for performing the method of any one of Examples 18 to 21.

Example 33 is a processor or other apparatus that includes any combination of modules and/or units and/or logic and/or circuitry and/or means operative to perform the method of any one of Examples 18 to 21.

Example 34 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 18 to 21.

Example 35 is a computer system or other electronic device that includes a processor having a decode unit operative to decode instructions of a first instruction set. The processor also has one or more execution units. The electronic device also includes a storage device coupled with the processor. The storage device is operative to store a first instruction, which may be any of the embodiments of the instructions substantially as disclosed herein (e.g., a begin or end memory write log instruction), and which is to be of a second different instruction set. The storage device is also operative to store instructions to convert the first instruction into one or more instructions of the first instruction set. The one or more instructions of the first instruction set, when performed by the processor, are operative to cause the processor to store one or more logs as described elsewhere herein.

Example 36 is a processor that includes means for receiving an instruction at the processor. The instruction to indicate a destination memory address information. The processor also includes means for storing memory addresses, in response to the instruction, for at least all initial writes to corresponding data items, which occur after the instruction in original program order, to a memory address log. A start of the memory address log is to correspond to the destination memory address information.

What is claimed is:

1. A processor comprising:
    a decode unit to decode an instruction, the instruction to indicate a destination memory address information corresponding to a start of a memory address log; and
    an execution unit coupled with the decode unit, the execution unit to perform the instruction, to:
        begin to log memory addresses to the memory address log, including to store memory addresses, for at least all initial writes to corresponding initial data items, to the memory address log, wherein the initial writes represent first writes to the initial data items that occur after the instruction in original program order to update the corresponding initial data items to updated data items; and
        store the initial data items, for said at least all initial writes, to a data item log, wherein the initial data items do not reflect the updates due to said at least all initial writes.

2. The processor of claim 1, wherein the execution unit, in response to the decode of the instruction, is to said store the memory addresses in a same order in position in the memory address log as an order that the associated said at least all initial writes occur over time.

3. The processor of claim 2, wherein the execution unit, in response to the decode of the instruction, is to said store the memory addresses in consecutive positions in the memory address log.

4. The processor of claim 3, wherein the execution unit, in response to the decode of the instruction, is to update a value, which is to be indicative of a memory location in the memory address log where a next memory address is to be stored, to account for a size of a memory address, when each of the memory addresses is said stored to the memory address log.

5. The processor of claim 1, wherein the decode unit is to decode the instruction that is to have at least one field indicate a second destination memory address information, and wherein the execution unit, in response to the decode of the instruction, is to said store the initial data items to the data item log, wherein a start of the data item log is to correspond to the second destination memory address information.

6. The processor of claim 1, wherein the data item log is a combined memory address and data item log, and wherein the corresponding memory addresses and the initial data items are to be interleaved with one another in the combined memory address and data item log.

7. The processor of claim 1, wherein the execution unit, in response to the decode of the instruction, is to store times indicative of when said at least all initial writes are performed to a time log.

8. The processor of claim 1, wherein the execution unit, in response to the decode of the instruction, is to stop storing the memory addresses to the memory address log when an end memory write log condition occurs.

9. The processor of claim 8, wherein the execution unit, in response to the decode of the instruction, is to:
    detect the occurrence of the end memory write log condition as a lack of resources to further track said at least all initial writes; and
    store an indication in an architecturally-visible storage location that the lack of resources was detected.

10. The processor of claim 1, wherein the decode unit is also to decode a second instruction that is to indicate a destination storage location, and further comprising a second execution unit coupled with the decode unit, the second execution unit, in response to the decode of the second instruction, to:
    cause the processor to stop storing memory addresses to the memory address log due to performance of the instruction; and
    store information indicative of a last memory location in the memory address log that was stored to, during the performance of the instruction, to the indicated destination storage location.

11. The processor of claim 10, wherein the information indicative of the last memory location is either a memory pointer to point to the last memory location or an offset from the destination memory location indicated by the instruction.

12. The processor of claim 10, wherein the second execution unit, in response to the decode of the second instruction, is to store an indication in an architecturally-visible storage location that the storage of the memory addresses to the memory address log was stopped due to the second instruction.

13. The processor of claim 1, wherein the processor is to transform the memory addresses, prior to the storage of the memory addresses to the memory address log, through at least one of encryption, compression, and addition of redundancy data for the memory addresses.

14. The processor of claim 1, wherein the data items are cache lines.

15. The processor of claim 1, wherein the execution unit, in response to the decode of the instruction, is not to store memory addresses for subsequent writes to the data items, which occur after the initial writes to the data items, to the memory address log.

16. The processor of claim 1, wherein the execution unit comprises transactional execution write-set tracking logic to track data items written to while performing the instruction.

17. The processor of claim 1, wherein the execution unit, in response to the decode of the instruction, is to log identifiers of processes that performed the initial writes.

18. A method performed by a processor comprising:
receiving an instruction at the processor, the instruction indicating a destination memory address information corresponding to a start of a memory address log;
beginning to log memory addresses to the memory address log, in response to the instruction, including storing memory addresses, for at least all initial writes to corresponding initial data items, to the memory address log, wherein the initial writes represent first writes to the initial data items occurring after the instruction in original program order and updating the corresponding initial data items to updated data items; and
storing the initial data items, for said at least all initial writes, to a data item log, wherein the initial data items stored do not include the updates due to said at least all initial writes.

19. The method of claim 18, further comprising, in response to the instruction storing times, which indicate when said at least all initial writes are performed, to a time log.

20. The method of claim 18, further comprising:
receiving a second instruction at the processor, the second instruction indicating a destination storage location; and
in response to the second instruction:
causing the processor to stop storing memory addresses to the memory address log due to performance of the instruction; and
storing information indicative of a last memory location in the memory address log that was stored to, during the performance of the instruction, in the indicated destination storage location.

21. A system to process instructions comprising:
an interconnect;
a processor coupled with the interconnect, the processor to receive an instruction, the instruction to indicate a destination memory address information corresponding to a start of a memory address log, the processor, in response to the instruction, to begin to log memory addresses to the memory address log, including to store memory addresses, for only all initial writes to corresponding data items, to the memory address log, wherein said initial writes represent first writes in time to the corresponding data items that occur after the instruction in original program order; and
a dynamic random-access memory (DRAM) coupled with the interconnect.

22. The system of claim 21, wherein the processor, in response to the instruction, is to store the data items, for said only all initial writes, before the data items are updated due to said at least all initial writes, to a data item log.

23. An article of manufacture comprising a non-transitory machine-readable storage medium, the non-transitory machine-readable storage medium storing a plurality of instructions including an instruction that is to indicate a destination memory address information corresponding to a start of a memory address log, the instruction, if executed by a machine, is to cause the machine to perform operations comprising to:
begin to log memory addresses to the memory address log, including to store memory addresses, for only all initial writes to corresponding data items, to the memory address log, wherein said initial writes represent first writes in time to the corresponding data items that occur after the instruction in original program order.

24. The article of manufacture of claim 23, wherein the instruction, if executed by the machine, is further to cause the machine to perform operations comprising to store the data items, for said only all initial writes, before the data items are updated due to said only all initial writes, to a data item log.

* * * * *